United States Patent
Hagersten et al.

(10) Patent No.: US 6,654,866 B2
(45) Date of Patent: *Nov. 25, 2003

(54) SKEWED FINITE HASHING FUNCTION

(75) Inventors: Erik E. Hagersten, Palo Alto, CA (US); Mark D. Hill, Madison, WI (US)

(73) Assignee: Sun Microsystems, Inc., Santa Clara, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 09/940,172

(22) Filed: Aug. 27, 2001

(65) Prior Publication Data

US 2002/0019921 A1 Feb. 14, 2002

Related U.S. Application Data

(63) Continuation of application No. 09/148,820, filed on Sep. 4, 1998, now Pat. No. 6,308,246, which is a continuation-in-part of application No. 08/924,385, filed on Sep. 5, 1997, now abandoned.

(51) Int. Cl.[7] .......................... G06F 12/10; G06F 12/12
(52) U.S. Cl. ..................... 711/205; 711/206; 711/133
(58) Field of Search .............................. 711/100, 128, 711/133, 134, 135, 136, 207, 216, 221

(56) References Cited

U.S. PATENT DOCUMENTS 5,341,483 A    8/1994    Frank et al.

OTHER PUBLICATIONS

Francois Bodin & Andre Seznec; "Skewed Associativity Improves Program Performance and Enhances Predictability"; May 1997; IEEE Transactions on Computers.

Francois Bodin & Adnre Seznec; "Skewed Associativity Enhances Performance Predictability"; Feb. 1995; Publication No. 909; Campus Universitaire De Beaulieu–35042 Rennes Cedex; France.

*Primary Examiner*—Tuan V. Thai
(74) *Attorney, Agent, or Firm*—Meyertons Hood Kivlin Kowert & Goetzel P.C.; Rory D. Rankin

(57) ABSTRACT

A portion of the global memory of a multiprocessing computer system is allocated to each node, called local memory space. Data from a remote node may be copied to local memory space of a node such that accesses to the data may be performed locally rather than globally. The global address of the data is translated to a local physical address for the node to which the data is copied. To reduce the size of the translation tables for converting between global addresses and local physical addresses, multiple pages of the address space are mapped to an entry in a translation table. To decrease the probability that an entry is not available for a page, the translation table may be implemented as a skewed-associative cache that implements an insertion algorithm that realigns the translations in the table to maximize the utilization of the available entries is implemented.

21 Claims, 19 Drawing Sheets

| V 73 | WB 75 | Owner 77 | Sharers 79 |

FIG. 2A

GAZLPA Table 112

| AT | | AT | |
|---|---|---|---|
| AT | | AT | |
| AT | | AT | |
| ⋮ | | ⋮ | |
| AT | | AT | |

*FIG. 11*

SKEWED FINITE HASHING FUNCTION

CROSS REFERENCE TO RELATED PATENT APPLICATIONS

This patent application is a continuation of, commonly assigned patent application Ser. No. 09/148,820, "Skewed Finite Hashing Function" by Erik. E. Hagersten, filed Sep. 4, 1998, now U.S. Pat. No. 6,308,246, which is a continuation-in-part of commonly assigned patent application Ser. No. 08/924,385, "Hierarchical Computer System" by Erik E. Hagersten, filed Sep. 5, 1997, now abandoned, the disclosures of which are incorporated herein by reference in their entirety.

BACKGROUND OF THE INVENTION

1. Field of the Invention

This invention relates to the field of translation tables and, more particularly, to skewed hashing functions employed within translation tables of multiprocessor computer systems.

2. Description of the Relevant Art

Multiprocessing computer systems include two or more processors which may be employed to perform computing tasks. A particular computing task may be performed upon one processor while other processors perform unrelated computing tasks. Alternatively, components of a particular computing task may be distributed among multiple processors to decrease the time required to perform the computing task as a whole. Generally speaking, a processor is a device configured to perform an operation upon one or more operands to produce a result. The operation is performed in response to an instruction executed by the processor.

A popular architecture in commercial multiprocessing computer systems is the symmetric multiprocessor (SMP) architecture. Typically, an SMP computer system comprises multiple processors connected through a cache hierarchy to a shared bus. Additionally connected to the bus is a memory, which is shared among the processors in the system. Access to any particular memory location within the memory occurs in a similar amount of time as access to any other particular memory location. Since each location in the memory may be accessed in a uniform manner, this structure is often referred to as a uniform memory architecture (UMA).

Processors are often configured with internal caches, and one or more caches are typically included in the cache hierarchy between the processors and the shared bus in an SMP computer system. Multiple copies of data residing at a particular main memory address may be stored in these caches. In order to maintain the shared memory model, in which a particular address stores exactly one data value at any given time, shared bus computer systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches which are storing copies of the previous data. Alternatively, the copies of the previous data may be invalidated in the caches such that a subsequent access to the particular memory address causes the updated copy to be transferred from main memory. For shared bus systems, a snoop bus protocol is typically employed. Each coherent transaction performed upon the shared bus is examined (or "snooped") against data in the caches. If a copy of the affected data is found, the state of the cache line containing the data may be updated in response to the coherent transaction.

Unfortunately, shared bus architectures suffer from several drawbacks which limit their usefulness in multiprocessing computer systems. A bus is capable of a peak bandwidth (e.g. a number of bytes/second which may be transferred across the bus). As additional processors are attached to the bus, the bandwidth required to supply the processors with data and instructions may exceed the peak bus bandwidth. Since some processors are forced to wait for available bus bandwidth, performance of the computer system suffers when the bandwidth requirements of the processors exceeds available bus bandwidth.

Additionally, adding more processors to a shared bus increases the capacitive loading on the bus and may even cause the physical length of the bus to be increased. The increased capacitive loading and extended bus length increases the delay in propagating a signal across the bus. Due to the increased propagation delay, transactions may take longer to perform. Therefore, the peak bandwidth of the bus may decrease as more processors are added.

These problems are further magnified by the continued increase in operating frequency and performance of processors. The increased performance enabled by the higher frequencies and more advanced processor microarchitectures results in higher bandwidth requirements than previous processor generations, even for the same number of processors. Therefore, buses which previously provided sufficient bandwidth for a multiprocessing computer system may be insufficient for a similar computer system employing the higher performance processors.

Another structure for multiprocessing computer systems is a distributed shared memory architecture. A distributed shared memory architecture includes multiple nodes within which processors and memory reside. The multiple nodes communicate via a network coupled there between. When considered as a whole, the memory included within the multiple nodes forms the shared memory for the computer system. Typically, directories are used to identify which nodes have cached copies of data corresponding to a particular address. Coherency activities may be generated via examination of the directories.

Distributed shared memory systems are scaleable, overcoming the limitations of the shared bus architecture. Since many of the processor accesses are completed within a node, nodes typically have much lower bandwidth requirements upon the network than a shared bus architecture must provide upon its shared bus. The nodes may operate at high clock frequency and bandwidth, accessing the network when needed. Additional nodes may be added to the network without affecting the local bandwidth of the nodes. Instead, only the network bandwidth is affected.

Distributed shared memory system may employ local and global address spaces. A portion of the global address space may be assigned to each node within the distributed shared memory system. In some distributed shared memory systems, data corresponding to the address of remote nodes may be copied to a requesting node's shared memory such that future accesses to that data may be performed via local transactions rather than global transactions. The copied data is referred to as shadow pages. In such systems, CPU's local to the node may use the local physical address may be assigned to shadow pages. Address translation tables are provided to translate between the global address and the local physical address assigned to the shadow pages. In distributed shared memory systems with large address spaces, the translation tables used to translate between global addresses and local physical addresses can become very large. For example, in a distributed shared memory system with four nodes with 1M pages per node, a global address to local physical address translation table may include 4M entries. In some systems, the access time of such a large translation table may add unacceptable delay to a memory transaction.

To reduce the latency and the implementation cost associated with a global address to local physical address translation, some distributed shared memory systems employ a cache for storing the most recently accessed translations. The cache reduces the propagation delay for translations stored in the cache. Cache misses, however, add significant latency and the cache adds significant complexity to the translation table.

To decrease the number of cache misses, the size of the cache may be increased or the cache may be made set associative. Associative caches trade-off utilization for access time. In other words, the higher the associatively of a cache, the longer the access time. For example, a fully associative cache may approach 100% utilization. However, the access time of a fully associative cache is relatively long because each entry in the cache may be queried for the desired data. Alternatively, a direct mapped cache has a relatively short access time (only one entry is accessed), but the utilization of a direct mapped cache may be relatively low. A look-up table with high utilization and short access times is desirable.

SUMMARY OF THE INVENTION

The problems outlined above are in large part solved by a skewed-associative table that implements an insertion algorithm to maximize the utilization of the table. In one embodiment, an input address is converted to two look-up addresses using one or more index functions. The look-up addresses address a primary entry associated with the input address and a secondary entry associated with the input address. Only the primary entry and the secondary entry need to be accessed during a table look-up. An insertion algorithm maximizes the utilization of the table by realigning the data stored in the table to make an entry available for new data. For example, if a primary entry and secondary entry associated with an input address are occupied by other entries, the insertion algorithm will move the data stored in either the primary entry or the secondary entry to an alternative entry for that data. By moving the data to an alternative entry, the entry is made available to store the new data. If the alternative entries for the data stored in the primary entry and secondary entry is unavailable, the data stored in the alternative entries are stored in an alternative entry for that data. The data in the primary entry or secondary entry is then stored to its alternative entry and the entry is made available to store the new data. Accordingly, the insertion algorithm increases the utilization of the table to approach the utilization of a fully associative table while the access time of the table is similar to a two-way set-associative table. It is noted that the present invention applies to caches as well as tables.

Broadly speaking the present invention contemplates a look-up table configured to store and output data corresponding to input addresses. The lookup table includes a plurality of entries for storing the data and a look-up address circuit. The look-up address circuit is configured to receive the input address and includes a first index function circuit and a second index function circuit. The first index function circuit is configured to convert a first input address to a primary look-up address that corresponds to the first input address, wherein a primary entry of the plurality of entries is addressed by the primary look-up address. The second index function circuit is configured to convert the first input address to a secondary look-up address that corresponds to the first input address, wherein a secondary entry of the plurality of entries is addressed by the secondary look-up address. The look-up table is configured to store a first datum to the primary entry if the primary entry is available and to store the first datum to the secondary entry if the primary entry is unavailable. If the primary entry and the secondary entry are unavailable, the look-up table is configured to move a second datum stored in the primary entry (or secondary entry) to an alternate entry for the second datum and to store the first datum to the primary (or secondary entry) entry.

The present invention further contemplates a method of storing and retrieving data in a look-up table wherein the data corresponds to input addresses and each input address corresponds to a primary entry and a secondary entry of the look-up table comprising: if a primary entry corresponding to a first input address is available, storing a first datum to the primary entry; if the primary entry is unavailable, storing the first datum to a secondary entry corresponding to the first input address; if the primary entry and the secondary entry are unavailable, moving a second datum stored in the primary entry (or secondary entry) to an alternate entry of the second datum and storing the first datum to the primary entry (or secondary entry).

BRIEF DESCRIPTION OF THE DRAWINGS

Other objects and advantages of the invention will become apparent upon reading the following detailed description and upon reference to the accompanying drawings in which:

FIG. 2A is an exemplary directory entry stored in one embodiment of a directory depicted in FIG. 2.

FIG. 11 is a block diagram illustrating an organization of a global address to local physical address translation table according to one embodiment of the present invention.

Figure 1:
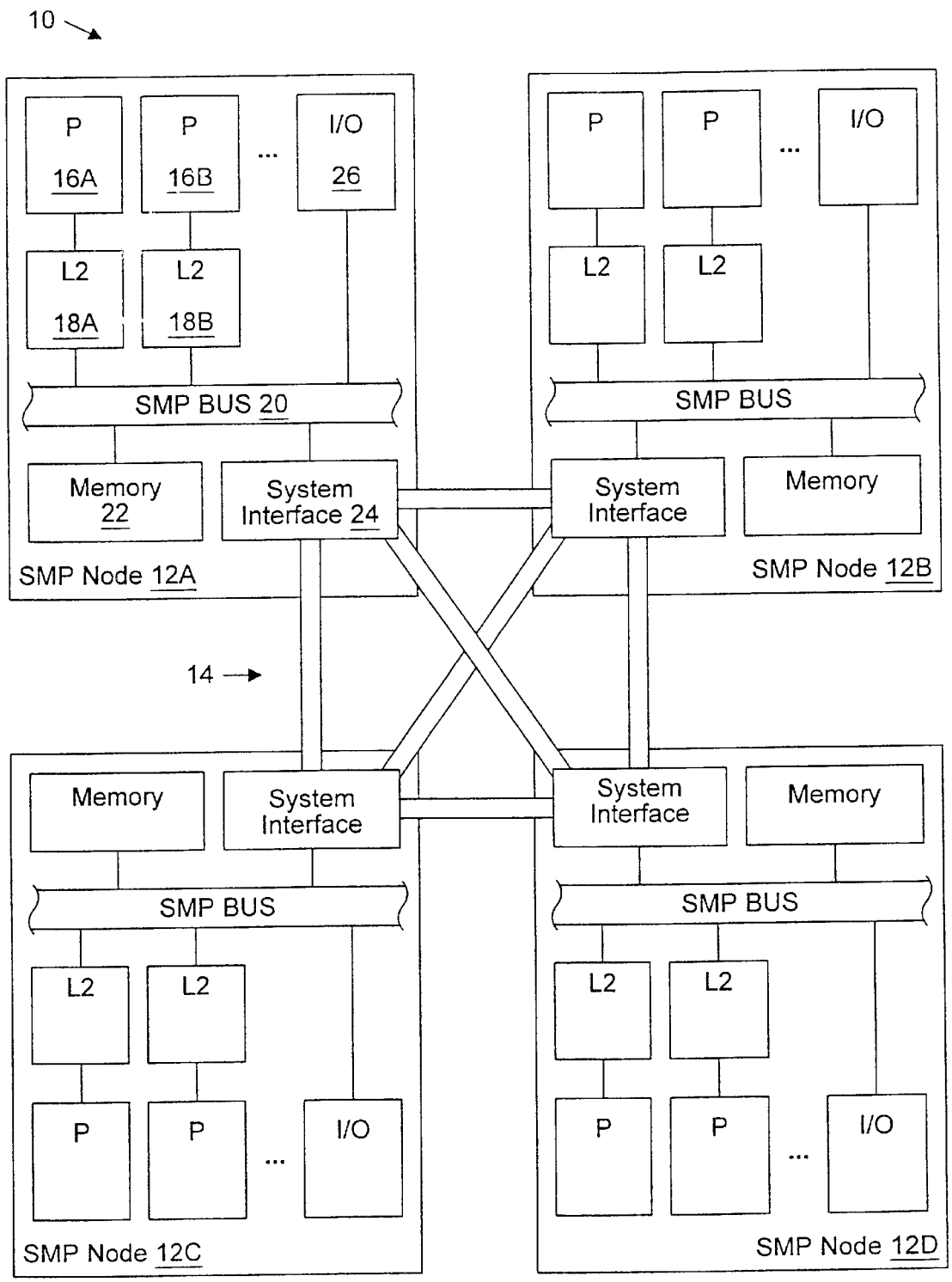
FIG. 1 is a block diagram of a multiprocessor computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a multiprocessing computer system 10 is shown. Computer system 10 includes multiple SMP nodes 12A–12D interconnected by a point-to-point network 14. Elements referred to herein with a particular reference number followed by a letter will be collectively referred to by the reference number alone. For example, SMP nodes 12A–12D will be collectively referred to as SMP nodes 12. In the embodiment shown, each SMP node 12 includes multiple processors, external caches, an SMP bus, a memory, and a system interface. For example, SMP node 12A is configured with multiple processors including processors 16A–16B. The processors 16 are connected to external caches 18, which are further coupled to an SMP bus 20. Additionally, a memory 22 and a system interface 24 are coupled to SMP bus 20. Still further, one or more input/output (I/O) interfaces 26 may be coupled to SMP bus 20. I/O interfaces 26 are used to interface to peripheral devices such as serial and parallel ports, disk drives, modems, printers, etc. Other SMP nodes 12B–12D may be configured similarly.

Generally speaking, the memory, or physical address space, of a computer system is distributed among SMP nodes 12A–12D. The memory assigned to a node is referred to as the local memory of that node. Typically, accesses to a node's local memory are local transactions and accesses to other node's local memory are global transactions. In one embodiment, a node may store a shadow copy of data from another node's local memory (the node which stores the original data is referred to as the home node). Accordingly, accesses to the shadow copy of data may be performed locally rather than accessing the data from the home node. When a shadow copy of a data is stored to a local node, the data is assigned an address within the local physical address space of the local node. Although data accesses to a shadow copy may be local, coherency operations are typically still global. For example, if a local node attempts to write to a shadow copy without sufficient access rights, a global coherency operation, such as a write invalidation operation, is performed to obtain write access rights to the data. When a coherency operation is performed, the local physical address assigned to the shadow copy is translated to the global address of the data using the LPA2GA table.

A coherence operation from another node arriving at a node with a shadow copy of the requested page will need the reverse translation from a global address to a local physical address. Generally speaking, a global address to local physical address translation (GA2LPA) table may be implemented as a two-way set-associative cache that uses an insertion algorithm to maximize the utilization of the table. During a table look-up, only two entries need to be accessed which keeps the access time of the table to a minimum. The insertion algorithm, however, maximizes the utilization of the table by realigning data stored in the table if an entry for new data is not available.

In one embodiment, the insertion algorithm of the GA2LPA translation table is implemented by software. The insertion algorithm first determines if the primary entry is available. If the primary entry is available, the translation is stored to the primary entry. If the primary entry is unavailable, the insertion algorithm determines if the secondary entry is available. If the secondary entry is available, the translation is stored to the secondary entry. If both the primary and secondary entries are unavailable, the insertion algorithm makes an entry available for the new translation by realigning the translations stored in the table. First, the translation that occupies the primary (or secondary) entry both have alternative locations. Accordingly, one of the translations may be moved to an alternate entry, which makes an entry available for storing the new translation. If the alternative location of the translation stored in the primary (or secondary) entry is unavailable, the translation in the alternate entry of the alternate entry of the translation stored in the primary (or secondary) entry may be moved to its alternate. This makes the alternative entry of the translation stored in the primary (or secondary) entry available and the translation is moved to its alternate entry. The primary (or secondary) entry is then available for storing the new translation. Several iterations of the above methodology may be repeated before an entry is available for the new translation.

As used herein, a memory operation is an operation causing the transfer of data from a source to a destination. The source and/or destination may be storage locations within the initiator, or may be storage locations within memory. When a source or destination is a storage location within memory, the source or destination is specified via an address conveyed with the memory operation. Memory operations may be read or write operations. A read operation causes transfer of data from a source outside of the initiator to a destination within the initiator. Conversely, a write operation causes transfer of data from a source within the initiator to a destination outside of the initiator. In the computer system shown in FIG. 1, a memory operation may include one or more transactions upon SMP bus 20 as well as one or more coherency operations upon network 14.

Each SMP node 12 is essentially an SMP system having memory 22 as the shared memory. Processors 16 are high performance processors. In one embodiment, each processor 16 is a SPARC processor compliant with version 9 of the SPARC processor architecture. It is noted, however, that any processor architecture may be employed by processors 16.

Typically, processors 16 include internal instruction and data caches. Therefore, external caches 18 are labeled as L2 caches (for level 2, wherein the internal caches are level 1 caches). If processors 16 are not configured with internal caches, then external caches 18 are level 1 caches. It is noted that the "level" nomenclature is used to identify proximity of a particular cache to the processing core within processor 16. Level 1 is nearest the processing core, level 2 is next nearest, etc. External caches 18 provide rapid access to memory addresses frequently accessed by the processor 16 coupled thereto. It is noted that external caches 18 may be configured in any of a variety of specific cache arrangements. For example, set-associative or direct-mapped configurations may be employed by external caches 18.

SMP bus 20 accommodates communication between processors 16 (through caches 18), memory 22, system interface 24, and I/O interface 26. In one embodiment, SMP bus 20 includes an address bus and related control signals, as well as a data bus and related control signals. A split-transaction bus protocol may be employed upon SMP bus 20. Generally speaking, a split-transaction bus protocol is a protocol in which a transaction on the bus is implemented by several asynchronous phases. Transactions involving address and data include an address phase in which the address and related control information is conveyed upon the address bus, and a data phase in which the data is conveyed upon the data bus. Additional address phases and/or data phases for other transactions may be initiated prior to the data phase corresponding to a particular address phase. An address phase and the corresponding data phase may be correlated in a number of ways. For example, data transactions may occur in the same order that the address transactions occur. Alternatively, address and data phases of a transaction may be identified via a unique tag.

Memory 22 is configured to store data and instruction code for use by processors 16. Memory 22 preferably comprises dynamic random access memory (DRAM), although any type of memory may be used. Memory 22, in conjunction with similar illustrated memories in the other SMP nodes 12, forms a distributed shared memory system. Each address in the address space of the distributed shared memory is assigned to a particular node, referred to as the home node of the address. A processor within a different node than the home node may access the data at an address of the home node, potentially caching the data. Therefore, coherency is maintained between SMP nodes 12 as well as among processors 16 and caches 18 within a particular SMP node 12A–12D. System interface 24 provides internode coherency, while snooping upon SMP bus 20 provides intranode coherency.

In addition to maintaining internode coherency, system interface 24 detects addresses upon SMP bus 20 which require a data transfer to or from another SMP node 12. System interface 24 performs the transfer, and provides the corresponding data for the transaction upon SMP bus 20. In the embodiment shown, system interface 24 is coupled to a point-to-point network 14. However, it is noted that in alternative embodiments other networks may be used. In a point-to-point network, individual connections exist between each node upon the network. A particular node communicates directly with a second node via a dedicated link. To communicate with a third node, the particular node utilizes a different link than the one used to communicate with the second node.

It is noted that, although four SMP nodes 12 are shown in FIG. 1, embodiments of computer system 10 employing any number of nodes are contemplated.

Figure 1A:
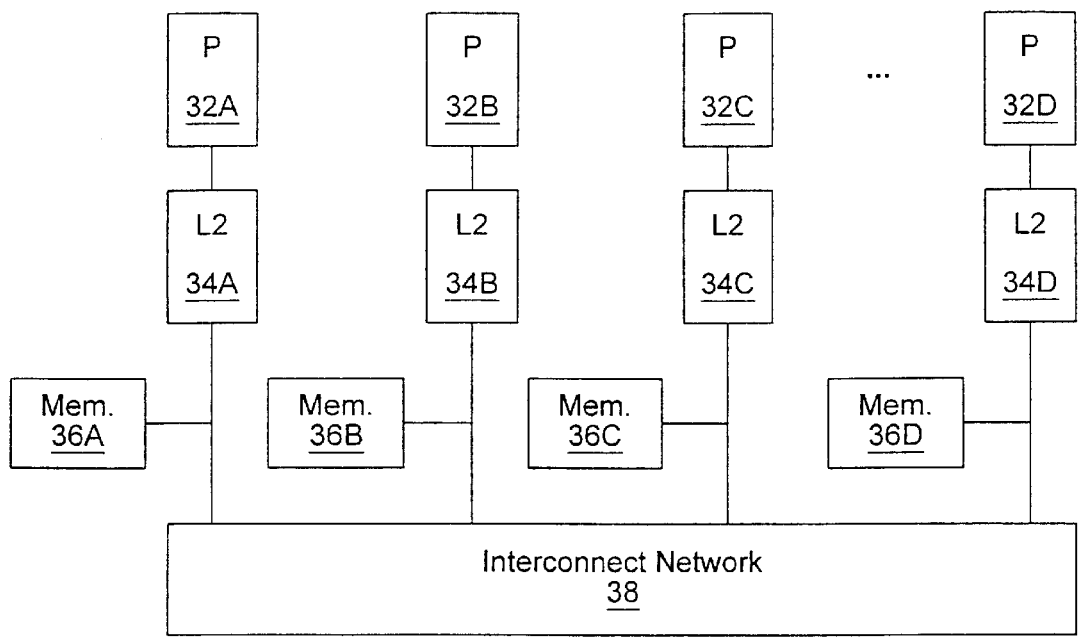
FIG. 1A is a conceptualized block diagram depicting a non-uniform memory architecture supported by one embodiment of the computer system shown in FIG. 1.
Figure 1B:
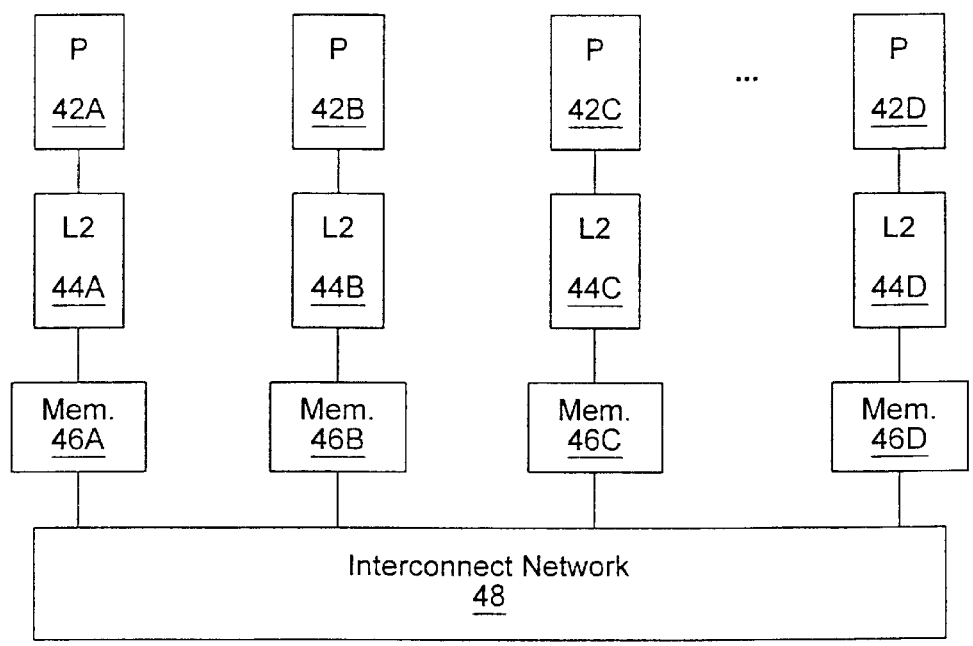
FIG. 1B is a conceptualized block diagram depicting a cache-only memory architecture supported by one embodiment of the computer system shown in FIG. 1.

FIGS. 1A and 1B are conceptualized illustrations of distributed memory architectures supported by one embodiment of computer system 10. Specifically, FIGS. 1A and 1B illustrate alternative ways in which each SMP node 12 of FIG. 1 may cache data and perform memory accesses. Details regarding the manner in which computer system 10 supports such accesses will be described in further detail below.

Turning now to FIG. 1A, a logical diagram depicting a first memory architecture 30 supported by one embodiment of computer system 10 is shown. Architecture 30 includes multiple processors 32A–32D, multiple caches 34A–34D, multiple memories 36A–36D, and an interconnect network 38. The multiple memories 36 form a distributed shared memory. Each address within the address space corresponds to a location within one of memories 36.

Architecture 30 is a non-uniform memory architecture (NUMA). In a NUMA architecture, the amount of time required to access a first memory address may be substantially different than the amount of time required to access a second memory address. The access time depends upon the origin of the access and the location of the memory 36A–36D which stores the accessed data. For example, if processor 32A accesses a first memory address stored in memory 36A, the access time may be significantly shorter than the access time for an access to a second memory address stored in one of memories 36B–36D. That is, an access by processor 32A to memory 36A may be completed locally (e.g. without transfers upon network 38), while a processor 32A access to memory 36B is performed via network 38. Typically, an access through network 38 is slower than an access completed within a local memory. For example, a local access might be completed in a few hundred nanoseconds while an access via the network might occupy a few microseconds.

Data corresponding to addresses stored in remote nodes may be cached in any of the caches 34. However, once a cache 34 discards the data corresponding to such a remote address, a subsequent access to the remote address is completed via a transfer upon network 38.

NUMA architectures may provide excellent performance characteristics for software applications which use addresses that correspond primarily to a particular local memory. Software applications which exhibit more random access patterns and which do not confine their memory accesses to addresses within a particular local memory, on the other hand, may experience a large amount of network traffic as a particular processor 32 performs repeated accesses to remote nodes.

Turning now to FIG. 1B, a logic diagram depicting a second memory architecture 40 supported by the computer system 10 of FIG. 1 is shown. Architecture 40 includes multiple processors 42A–42D, multiple caches 44A–44D, multiple memories 46A–46D, and network 48. However, memories 46 are logically coupled between caches 44 and network 48. Memories 46 serve as larger caches (e.g. a level 3 cache), storing addresses which are accessed by the corresponding processors 42. Memories 46 are said to "attract" the data being operated upon by a corresponding processor 42. As opposed to the NUMA architecture shown in FIG. 1A, architecture 40 reduces the number of accesses upon the network 48 by storing remote data in the local memory when the local processor accesses that data. The remote data stored in local memory is referred to herein as shadow pages of the remote data.

Architecture 40 is referred to as a cache-only memory architecture (COMA). Multiple locations within the distributed shared memory formed by the combination of memories 46 may store data corresponding to a particular address. No permanent mapping of a particular address to a particular storage location is assigned. Instead, the location storing data corresponding to the particular address changes dynamically based upon the processors 42 which access that particular address. Conversely, in the NUMA architecture a particular storage location within memories 46 is assigned to a particular address. Architecture 40 adjusts to the memory access patterns performed by applications executing thereon, and coherency is maintained between the memories 46.

In a preferred embodiment, computer system 10 supports both of the memory architectures shown in FIGS. 1A and 1B. In particular, a memory address may be accessed in a NUMA fashion from one SMP node 12A–12D while being accessed in a COMA manner from another SMP node 12A–12D. In one embodiment, a NUMA access is detected if the node ID bits of the address upon SMP bus 20 identify another SMP node 12 as the home node of the address presented. Otherwise, a COMA access is presumed. Additional details will be provided below. In one embodiment, a data accessed in a COMA manner is stored as a shadow page within the node accessing the data.

In one embodiment, the COMA architecture is implemented using a combination of hardware and software techniques. Hardware maintains coherency between the locally cached copies of pages, and software (e.g. the operating system employed in computer system 10) is responsible for deallocating and allocating cached pages.

Figure 2:
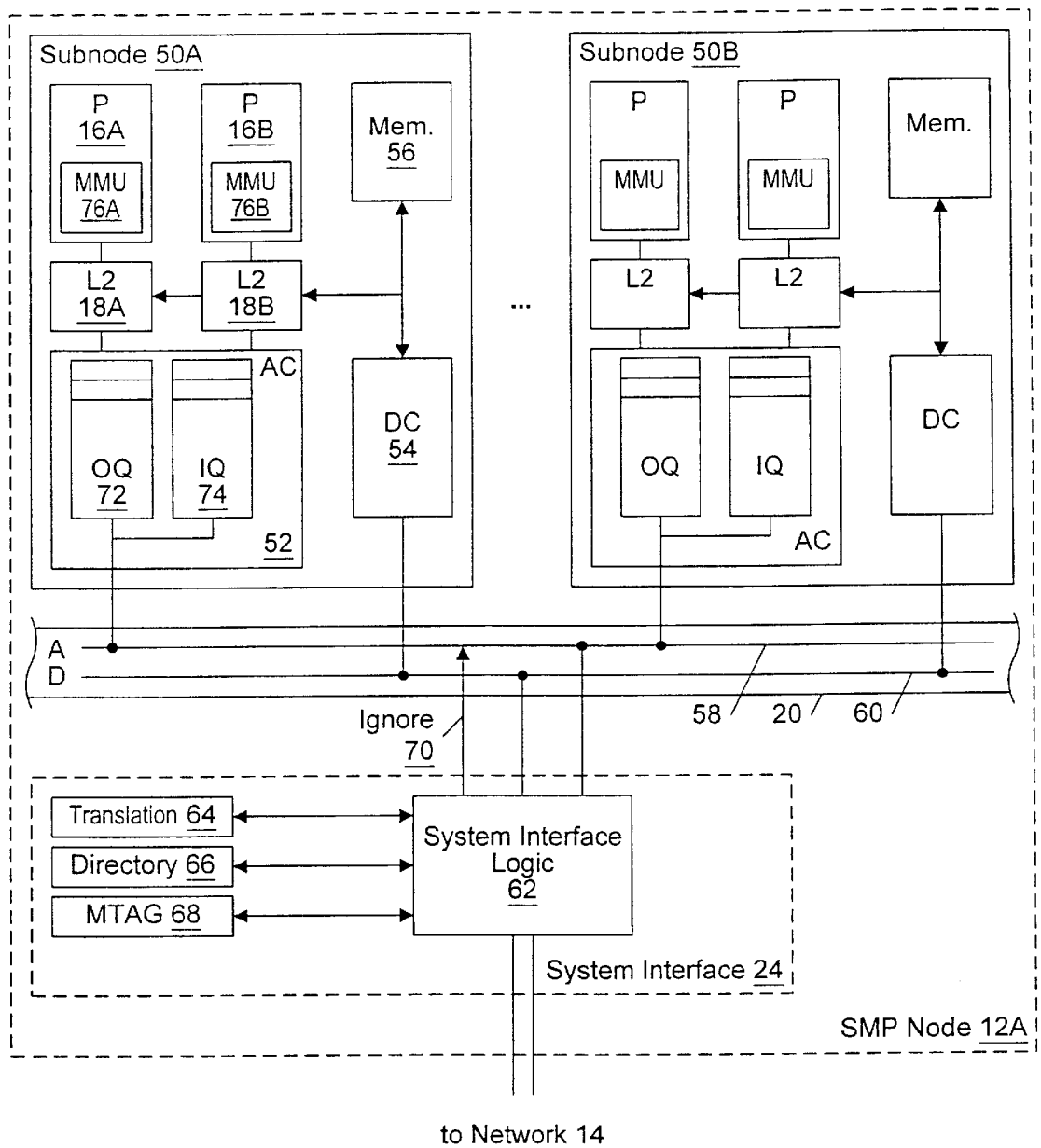
FIG. 2 is a block diagram of one embodiment of a symmetric multiprocessing node depicted in FIG. 1.

FIG. 2 depicts details of one implementation of an SMP node 12A that generally conforms to the SMP node 12A shown in FIG. 1. Other nodes 12 may be configured similarly. It is noted that alternative specific implementations of each SMP node 12 of FIG. 1 are also possible. The implementation of SMP node 12A shown in FIG. 2 includes multiple subnodes such as subnodes 50A and 50B. Each subnode 50 includes two processors 16 and corresponding caches 18, a memory portion 56, an address controller 52, and a data controller 54. The memory portions 56 within subnodes 50 collectively form the memory 22 of the SMP node 12A of FIG. 1. Other subnodes (not shown) are further coupled to SMP bus 20 to form the I/O interfaces 26.

As shown in FIG. 2, SMP bus 20 includes an address bus 58 and a data bus 60. Address controller 52 is coupled to address bus 58, and data controller 54 is coupled to data bus 60. FIG. 2 also illustrates system interface 24, including a system interface logic block 62, a translation storage 64, a directory 66, and a memory tag (MTAG) 68. Logic block 62 is coupled to both address bus 58 and data bus 60, and asserts an ignore signal 70 upon address bus 58 under certain circumstances as will be explained further below. Additionally, logic block 62 is coupled to translation storage 64, directory 66, MTAG 68, and network 14.

For the embodiment of FIG. 2, each subnode 50 is configured upon a printed circuit board which may be inserted into a backplane upon which SMP bus 20 is situated. In this manner, the number of processors and/or I/O interfaces 26 included within an SMP node 12 may be varied by inserting or removing subnodes 50. For example, computer system 10 may initially be configured with a small number of subnodes 50. Additional subnodes 50 may be added from time to time as the computing power required by the users of computer system 10 grows.

Address controller 52 provides an interface between caches 18 and the address portion of SMP bus 20. In the embodiment shown, address controller 52 includes an out queue 72 and some number of in queues 74. Out queue 72 buffers transactions from the processors connected thereto until address controller 52 is granted access to address bus 58. Address controller 52 performs the transactions stored in out queue 72 in the order those transactions were placed into out queue 72 (i.e. out queue 72 is a FIFO queue). Transactions performed by address controller 52 as well as transactions received from address bus 58 which are to be snooped by caches 18 and caches internal to processors 16 are placed into in queue 74.

Similar to out queue 72, in queue 74 is a FIFO queue. All address transactions are stored in the in queue 74 of each subnode 50 (even within the in queue 74 of the subnode 50 which initiates the address transaction). Address transactions are thus presented to caches 18 and processors 16 for snooping in the order they occur upon address bus 58. The order that transactions occur upon address bus 58 is the order for SMP node 12A. However, the complete system is expected to have one global memory order. This ordering expectation creates a problem in both the NUMA and COMA architectures employed by computer system 10, since the global order may need to be established by the order of operations upon network 14. If two nodes perform a transaction to an address, the order that the corresponding coherency operations occur at the home node for the address defines the order of the two transactions as seen within each node. For example, if two write transactions are performed to the same address, then the second write operation to arrive at the address' home node should be the second write transaction to complete (i.e. a byte location which is updated by both write transactions stores a value provided by the second write transaction upon completion of both transactions). However, the node which performs the second transaction may actually have the second transaction occur first upon SMP bus 20. Ignore signal 70 allows the second transaction to be transferred to system interface 24 without any of the CPU's or I/O devices in the SMP node 12 reacting to the transaction.

Therefore, in order to operate effectively with the ordering constraints imposed by the out queue/in queue structure of address controller 52, system interface logic block 62 employs ignore signal 70. When a transaction is presented upon address bus 58 and system interface logic block 62 detects that a remote transaction is to be performed in response to the transaction, logic block 62 asserts the ignore signal 70. Assertion of the ignore signal 70 with respect to a transaction causes address controller 52 to inhibit storage of the transaction into in queues 74. Therefore, other transactions which may occur subsequent to the ignored transaction and which complete locally within SMP node 12A may complete out of order with respect to the ignored transaction without violating the ordering rules of in queue 74. In particular, transactions performed by system interface 24 in response to coherency activity upon network 14 may be performed and completed subsequent to the ignored transaction. When a response is received from the remote transaction, the ignored transaction may be reissued by system interface logic block 62 upon address bus 58. The transaction is thereby placed into in queue 74, and may complete in order with transactions occurring at the time of reissue.

It is noted that in one embodiment, once a transaction from a particular address controller 52 has been ignored, subsequent coherent transactions from that particular address controller 52 are also ignored. Transactions from a particular processor 16 may have an important ordering relationship with respect to each other, independent of the ordering requirements imposed by presentation upon address bus 58. For example, a transaction may be separated from another transaction by a memory synchronizing instruction such as the MEMBAR instruction included in the SPARC architecture. The processor 16 conveys the transactions in the order the transactions are to be performed with respect to each other.

Data controller 54 routes data to and from data bus 60, memory portion 56 and caches 18. Data controller 54 may include in and out queues similar to address controller 52. In one embodiment, data controller 54 employs multiple physical units in a byte sliced bus configuration.

Processors 16 as shown in FIG. 2 include memory management units (MMUs) 76A–76B. MMUs 76 perform a virtual to physical address translation upon the data addresses generated by the instruction code executed upon processors 16, as well as the instruction addresses. The addresses generated in response to instruction execution are virtual addresses. In other words, the virtual addresses are the addresses created by the programmer of the instruction code. The virtual addresses are passed through an address translation mechanism (embodied in MMUs 76), from which corresponding physical addresses are created. The physical address identifies a storage location within memory 22.

Virtual to physical address translation is performed for many reasons. For example, the address translation mechanism may be used to grant or deny a particular computing task's access to certain memory addresses. In this manner, the data and instructions within one computing task are isolated from the data and instructions of another computing task. Additionally, portions of the data and instructions of a computing task may be "paged out" to a hard disk drive. When a portion is paged out, the translation is invalidated. Upon access to the portion by the computing task, an interrupt occurs due to the failed translation. The interrupt allows the operating system to retrieve the corresponding information from the hard disk drive. In this manner, more virtual memory may be available than actual memory in memory 22. Many other uses for virtual memory are well known.

Referring back to computer system 10 shown in FIG. 1 in conjunction with the SMP node 12A implementation illustrated in FIG. 2, the physical address computed by MMUs 76 may be a local physical address (LPA) defining a location within the memory 22 associated with the SMP node 12 in which the processor 16 is located. MTAG 68 stores a coherency state for each "coherency unit" in memory 22. When an address transaction is performed upon SMP bus 20, system interface logic block 62 examines the coherency state stored in MTAG 68 for the accessed coherency unit. If the coherency state indicates that the SMP node 12 has sufficient access rights to the coherency unit to perform the access, then the address transaction proceeds. If, however, the coherency state indicates that coherency operations should be performed prior to completion of the transaction, then system interface logic block 62 asserts the ignore signal 70. Logic block 62 performs coherency operations upon network 14 to acquire the appropriate coherency state. When the appropriate coherency state is acquired, logic block 62 reissues the ignored transaction upon SMP bus 20. Subsequently, the transaction completes.

Generally speaking, the coherency state maintained for a coherency unit at a particular storage location (e.g. a cache or a memory 22) indicates the access rights to the coherency unit at that SMP node 12. The access right indicates the validity of the coherency unit, as well as the read/write permission granted for the copy of the coherency unit within that SMP node 12. In one embodiment, the coherency states employed by computer system 10 are modified, owned, shared, and invalid. The modified state indicates that the SMP node 12 has updated the corresponding coherency unit. Therefore, other SMP nodes 12 do not have a copy of the coherency unit. Additionally, when the modified coherency unit is discarded by the SMP node 12, the coherency unit is stored back to the home node. The owned state indicates that the SMP node 12 is responsible for the coherency unit, but other SMP nodes 12 may have shared copies. Again, when the coherency unit is discarded by the SMP node 12, the coherency unit is stored back to the home node. The shared state indicates that the SMP node 12 may read the coherency unit but may not update the coherency unit without acquiring the owned state. Additionally, other SMP nodes 12 may have copies of the coherency unit as well. Finally, the invalid state indicates that the SMP node 12 does not have a copy of the coherency unit. In one embodiment, the modified state indicates write permission and any state but invalid indicates read permission to the corresponding coherency unit.

As used herein, a coherency unit is a number of contiguous bytes of memory which are treated as a unit for coherency purposes. For example, if one byte within the coherency unit is updated, the entire coherency unit is considered to be updated. In one specific embodiment, the coherency unit is a cache line, comprising 64 contiguous bytes. It is understood, however, that a coherency unit may comprise any number of bytes.

System interface 24 also includes a translation mechanism which utilizes translation storage 64 to store translations from a local physical address (LPA) to a global address (GA), and from a GA back to a LPA. Certain bits within a physical address identify the home node for the address, at which coherency information is stored for that global address. For example, an embodiment of computer system 10 may employ four SMP nodes 12 such as that of FIG. 1. In such an embodiment, two bits of the physical address identify the home node. Preferably, bits from the most significant portion of the physical address are used to identify the home node. The same bits are used in the physical address to identify NUMA accesses. If the bits of the physical address indicate that the local node is not the home node, then the physical address is a global address and the transaction is performed in NUMA mode. Therefore, the operating system places global addresses in MMUs 76 for any NUMA-type pages. Conversely, the operating system places LPAs in MMU 76 for any COMA-type pages. It is noted that an LPA may be the same as a GA (for NUMA accesses to remote address and accesses to addresses allocated to local memory). Alternatively, an LPA may be translated to a GA when the LPA identifies storage locations that store copies of data having a home in another SMP node 12, i.e. shadow pages.

The directory 66 of a particular home node identifies which SMP nodes 12 have copies of data corresponding to a given physical address assigned to the home node such that coherency between the copies may be maintained. Additionally, the directory 66 of the home node identifies the SMP node 12 which owns the coherency unit. Therefore, while local coherency between caches 18 and processors 16 is maintained via snooping, system-wide (or global) coherency is maintained using MTAG 68 and directory 66. Directory 66 stores the coherency information corresponding to the coherency units which are assigned to SMP node 12A (i.e. for which SMP node 12A is the home node).

It is noted that for the embodiment of FIG. 2, directory 66 and MTAG 68 store information for each coherency unit (i.e., on a coherency unit basis). Conversely, translation storage 64 stores local physical to global address translations defined for pages. A page includes multiple coherency units, and is typically several kilobytes or even megabytes in size.

Computer system 10 accordingly creates local physical address to global address translations on a page basis (thereby allocating a local memory page for storing a copy of a remotely stored global page). Therefore, blocks of memory 22 are allocated to a particular global address on a page basis as well. However, as stated above, coherency states and coherency activities are performed upon a coherency unit. Therefore, when a page is allocated in memory to a particular global address, the data corresponding to the page is not necessarily transferred to the allocated memory. Instead, as processors 16 access various coherency units within the page, those coherency units are transferred from the owner of the coherency unit. In this manner, the data actually accessed by SMP node 12A is transferred into the corresponding memory 22. Data not accessed by SMP node 12A may not be transferred, thereby reducing overall bandwidth usage upon network 14 in comparison to embodiments which transfer the page of data upon allocation of the page in memory 22.

It is noted that in one embodiment, translation storage 64, directory 66, and/or MTAG 68 may be caches which store only a portion of the associated translation, directory, and MTAG information, respectively. The entirety of the translation, directory, and MTAG information may be stored in tables within memory 22 or a dedicated memory storage (not shown). If required information for an access is not found in the corresponding cache, the tables are accessed by system interface 24.

Figure 2A:
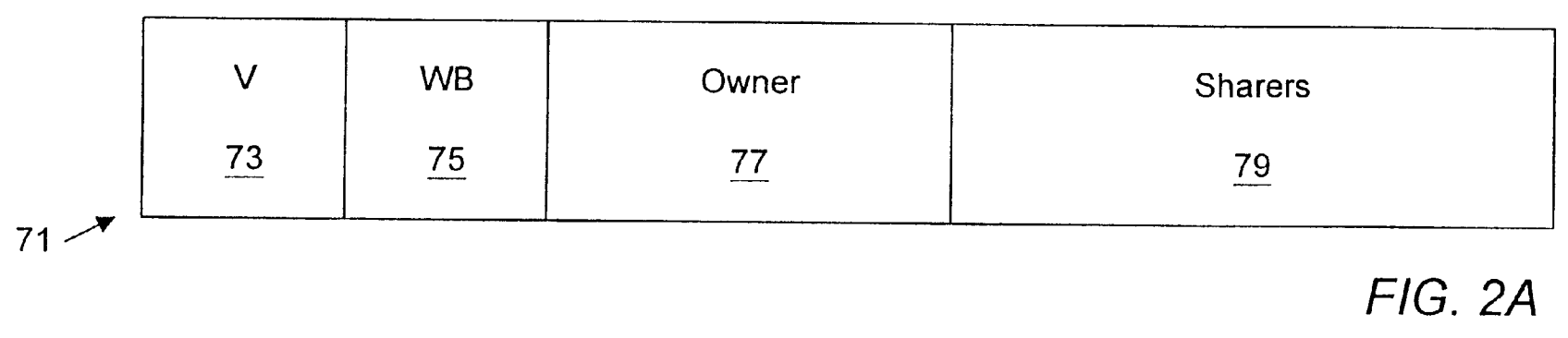

Turning now to FIG. 2A, an exemplary directory entry 71 is shown. Directory entry 71 may be employed by one embodiment of directory 66 shown in FIG. 2. Other embodiments of directory 66 may employ dissimilar directory entries. Directory entry 71 includes a valid bit 73, a write back bit 75, an owner field 77, and a sharers field 79. Directory entry 71 resides within the table of directory entries, and is located within the table via the global address identifying the corresponding coherency unit. More particularly, the directory entry 71 associated with a coherency unit is stored within the table of directory entries at an offset formed from the global address which identifies the coherency unit.

Valid bit 73 indicates, when set, that directory entry 71 is valid (i.e. that directory entry 71 is storing coherency information for a corresponding coherency unit). When clear, valid bit 73 indicates that directory entry 71 is invalid.

Owner field 77 identifies one of SMP nodes 12 as the owner of the coherency unit. The owning SMP node 12A–12D maintains the coherency unit in either the modified or owned states. Typically, the owning SMP node 12A–12D acquires the coherency unit in the modified state. Subsequently, the owning SMP node 12A–12D may then transition to the owned state upon providing a copy of the coherency unit to another SMP node 12A–12D. The other SMP node 12A–12D acquires the coherency unit in the shared state. In one embodiment, owner field 77 comprises two bits encoded to identify one of four SMP nodes 12A–12D as the owner of the coherency unit.

Sharers field 79 includes one bit assigned to each SMP node 12A–12D. If an SMP node 12A–12D is maintaining a shared copy of the coherency unit, the corresponding bit within sharers field 79 is set. Conversely, if the SMP node 12A–12D is not maintaining a shared copy of the coherency unit, the corresponding bit within sharers field 79 is clear. In this manner, sharers field 79 indicates all of the shared copies of the coherency unit which exist within the computer system 10 of FIG. 1.

Write back bit 75 indicates, when set, that the SMP node 12A–12D identified as the owner of the coherency unit via owner field 77 has written the updated copy of the coherency unit to the home SMP node 12. When clear, bit 75 indicates that the owning SMP node 12A–12D has not written the updated copy of the coherency unit to the home SMP node 12A–12D.

Figure 3:
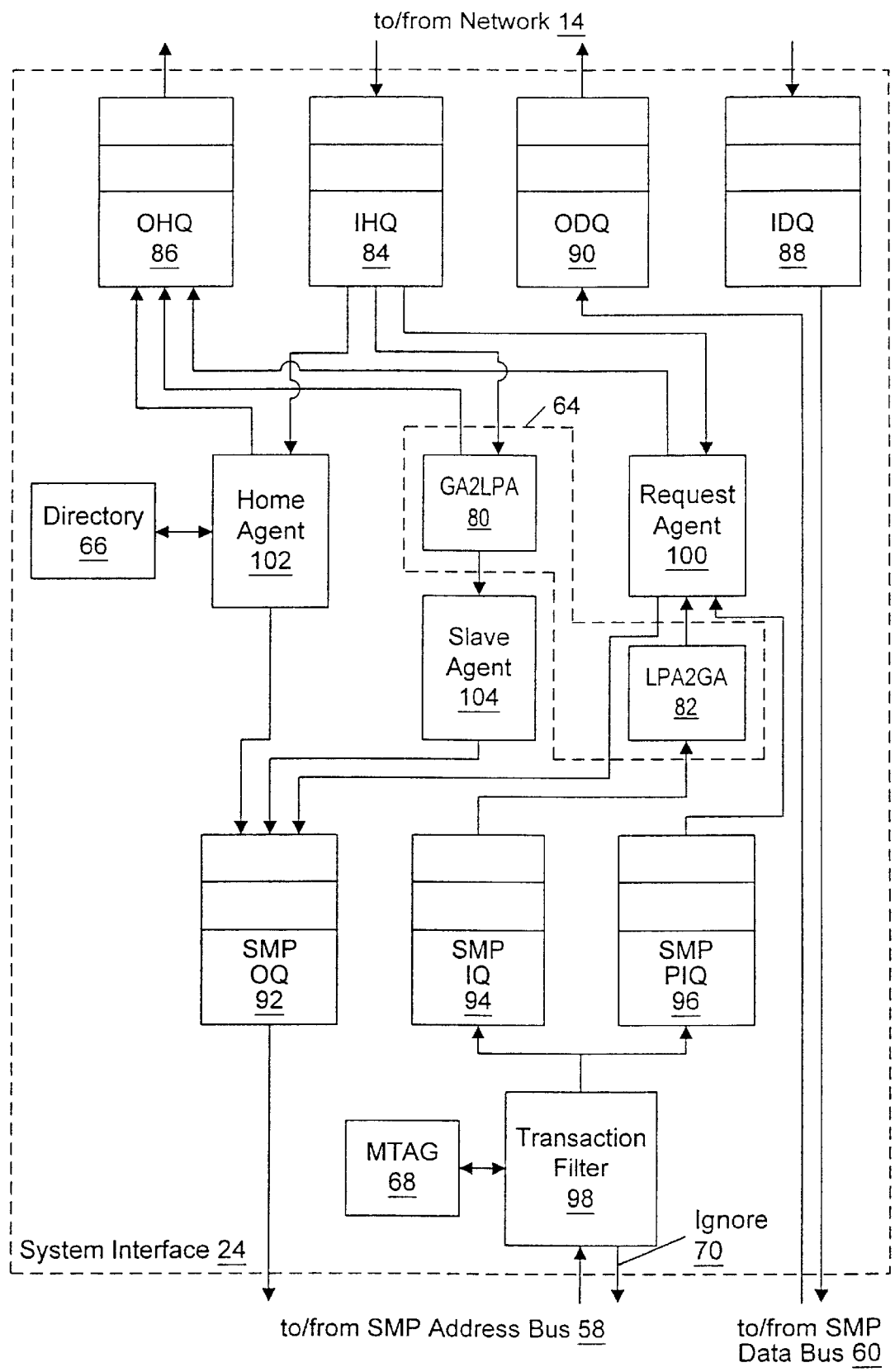
FIG. 3 is a block diagram of one embodiment of a system interface shown in FIG. 1.

Turning now to FIG. 3, a block diagram of one embodiment of system interface 24 is shown. As shown in FIG. 3, system interface 24 includes directory 66, translation storage 64, and MTAG 68. Translation storage 64 is shown as a global address to local physical address (GA2LPA) translation unit 80 and a local physical address to global address (LPA2GA) translation unit 82.

System interface 24 also includes input and output queues for storing transactions to be performed upon SMP bus 20 or network 14. Specifically, for the embodiment shown, system interface 24 includes input header queue 84 and output header queue 86 for buffering header packets to and from network 14. Header packets identify an operation to be performed, and specify the number and format of any data packets which may follow. Output header queue 86 buffers header packets to be transmitted upon network 14, and input header queue 84 buffers header packets received from network 14 until system interface 24 processes the received header packets. Similarly, data packets are buffered in input data queue 88 and output data queue 90 until the data may be transferred upon SMP data bus 60 and network 14, respectively.

SMP out queue 92, SMP in queue 94, and SMP I/O in queue (PIQ) 96 are used to buffer address transactions to and from address bus 58. SMP out queue 92 buffers transactions to be presented by system interface 24 upon address bus 58. Reissue transactions queued in response to the completion of coherency activity with respect to an ignored transaction are buffered in SMP out queue 92. Additionally, transactions generated in response to coherency activity received from network 14 are buffered in SMP out queue 92. SMP in queue 94 stores coherency related transactions to be serviced by system interface 24. Conversely, SMP PIQ 96 stores I/O transactions to be conveyed to an I/O interface residing in another SMP node 12. I/O transactions generally are considered non-coherent and therefore do not generate coherency activities.

SMP in queue 94 and SMP PIQ 96 receive transactions to be queued from a transaction filter 98. Transaction filter 98 is coupled to MTAG 68 and SMP address bus 58. If transaction filter 98 detects an I/O transaction upon address bus 58 which identifies an I/O interface upon another SMP node 12, transaction filter 98 places the transaction into SMP PIQ 96. If a coherent transaction to an LPA address is detected by transaction filter 98, then the corresponding coherency state from MTAG 68 is examined. In accordance with the coherency state, transaction filter 98 may assert ignore signal 70 and may queue a coherency transaction in SMP in queue 94. Ignore signal 70 is asserted and a coherency transaction queued if MTAG 68 indicates that insufficient access rights to the coherency unit for performing the coherent transaction is maintained by SMP node 12A. Conversely, ignore signal 70 is deasserted and a coherency transaction is not generated if MTAG 68 indicates that a sufficient access right is maintained by SMP node 12A.

Transactions from SMP in queue 94 are processed by a request agent 100 within system interface 24. Prior to action by request agent 100, LPA2GA translation unit 82 translates the address of the transaction (if it is an LPA address) from the local physical address presented upon SMP address bus 58 into the corresponding global address. Request agent 100 then generates a header packet specifying a particular coherency request to be transmitted to the home node identified by the global address. The coherency request is placed into output header queue 86. Subsequently, a coherency reply is received into input header queue 84. Request agent 100 processes the coherency replies from input header queue 84, potentially generating reissue transactions for SMP out queue 92 (as described below).

Also included in system interface 24 is a home agent 102 and a slave agent 104. Home agent 102 processes coherency requests received from input header queue 84. From the coherency information stored in directory 66 with respect to a particular global address, home agent 102 determines if a coherency demand is to be transmitted to one or more slave agents in other SMP nodes 12. In one embodiment, home agent 102 blocks the coherency information corresponding to the affected coherency unit. In other words, subsequent requests involving the coherency unit are not performed until the coherency activity corresponding to the coherency request is completed. According to one embodiment, home agent 102 receives a coherency completion from the request agent which initiated the coherency request (via input header queue 84). The coherency completion indicates that the coherency activity has completed. Upon receipt of the coherency completion, home agent 102 removes the block upon the coherency information corresponding to the affected coherency unit. It is noted that, since the coherency information is blocked until completion of the coherency activity, home agent 102 may update the coherency information in accordance with the coherency activity performed immediately when the coherency request is received.

Slave agent 104 receives coherency demands from home agents of other SMP nodes 12 via input header queue 84. In response to a particular coherency demand, slave agent 104 may queue a coherency transaction in SMP out queue 92. In one embodiment, the coherency transaction may cause caches 18 and caches internal to processors 16 to invalidate the affected coherency unit. Alternatively, the coherency transaction may cause caches 18 and caches internal to processors 16 to change the coherency state of the coherency unit to shared. Prior to performing activities in response to a coherency demand, the global address received with the coherency demand is translated to a local physical address via GA2LPA translation unit 80. Once slave agent 104 has completed activity in response to a coherency demand, slave agent 104 transmits a coherency reply to the request agent which initiated the coherency request corresponding to the coherency demand.

According to one embodiment, the coherency protocol enforced by request agents 100, home agents 102, and slave agents 104 includes a write invalidate policy. In other words, when a processor 16 within an SMP node 12 updates a coherency unit, any copies of the coherency unit stored within other SMP nodes 12 are invalidated. However, other write policies may be used in other embodiments. For example, a write update policy may be employed. According to a write update policy, when an coherency unit is updated the updated data is transmitted to each of the copies of the coherency unit stored in each of the SMP nodes 12.

Referring back to FIG. 2, the verification and acquisition of coherency rights according to one embodiment of the present invention are discussed below. When processor 16 attempts to read or write to a memory location, the MMU within processor 16 converts the virtual address generated by the program to a physical address. The physical address includes a node ID field which indicates the home node to which the physical address is assigned. If the home node corresponds to the node which initiates the transaction (i.e. the requesting node), the address is referred to as a local physical address. Alternatively, if the node ID field identifies a node other than the requesting node, the address is referred to as a global address. Using the physical address, processor 16 determines whether the data that corresponds to the physical address is stored in cache 18. Cache 18 may store data corresponding to local physical addresses or data corresponding to global addresses (data accessed in a NUMA manner may be stored in cache with a global address). The data corresponding to local physical addresses may be one of two types. The local physical address may correspond to memory locations assigned to the local node or it may correspond to shadow copies of data from a remote node (i.e. data accessed in a COMA manner).

If the data is found in cache 18, processor 16 accesses the data from the cache. Alternatively, if the data is not located in cache 18, then a request for the data is output on SMP bus 20. If the physical address is a global address, system interface 24 will initiate a global transaction to acquire the desired data. Alternatively, if the physical address is a local physical address, system interface logic 62 will determine whether the node has sufficient access rights to perform the transaction by reading the entry of MTAG 68 that corresponds to address. If the node has sufficient access rights for the desired transaction, the transaction is performed on the data in memory 22. If the node does not have sufficient access rights, the node must acquire sufficient access rights before performing the transaction. The node obtains the access rights by initiating a coherency operation to obtain those rights.

In one embodiment, each node includes two logical address spaces. Both logical address spaces are mapped to the entire memory 22 and are synonyms for accessing the same memory location. A first address space, called CMR space, stores shadow copies of data from other nodes. The remaining data is stored in a second address space, called local address space.

In one embodiment, a local physical address includes an address bit, called a CMR bit, that indicates whether the local physical address corresponds to an address assigned to the requesting node (i.e., the requesting node is the home node for the data) or to a shadow page within the CMR address space (i.e., a shadow copy of data from a remote node). If the CMR bit is set, which indicates the data is a shadow page, system interface 24 translates the local physical address to a global address prior to performing a coherency operation. Alternatively, if the CMR bit is clear, which indicates the requesting node is the home node for the data, the local physical address is the same as the global address and no translation is necessary prior to performing a coherency operation. Addresses with the CMR bit set are mapped to CMR space. Addresses with the CMR bit cleared are mapped to local address space.

Without the CMR bit, system interface logic 24 cannot differentiate between a local physical address that corresponds to local data and a local physical address that corresponds to a shadow copy of remote data. Accordingly, system interface 24 will translate all local physical addresses prior to performing a coherency operation. Because the translation is unnecessary for local physical addresses that correspond to local data, the translation adds unnecessary latency to the transaction and increases the bandwidth that translation storage 64 must handle. A protocol for acquiring sufficient access rights is discussed in more detail in copending, commonly assigned patent application (A Multiprocessing Computer System Employing Local and Global Address Spaces And Multiple Access Modes), filed Jul. 1, 1996, Ser. No. 08/675,635, which is herein incorporated by reference in its entirety.

Figure 4:
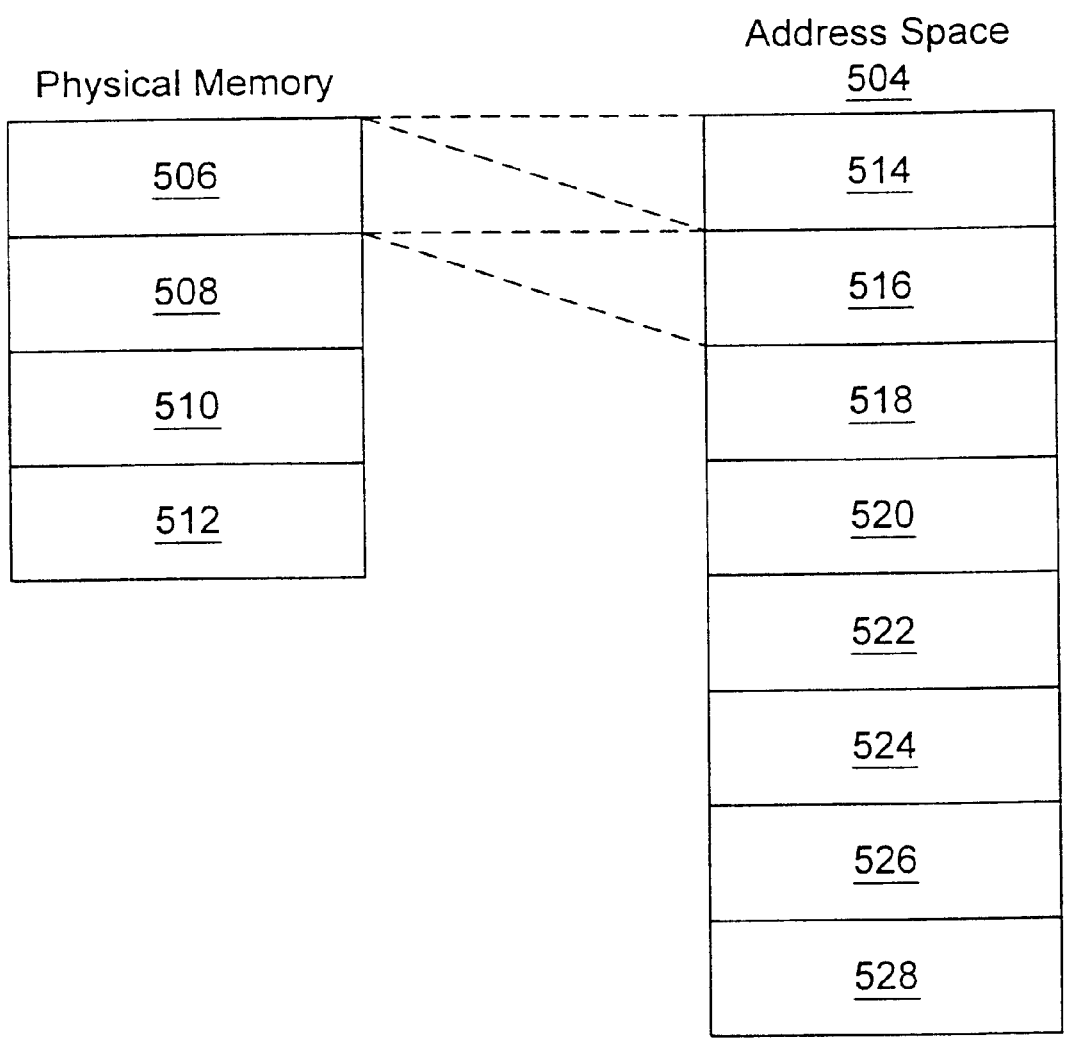
FIG. 4 is a mapping of a physical address space and a logical address space of a four-node multiprocessing computer system according to one embodiment of the present invention.

Turning now to FIG. 4, a diagram illustrating a physical address space and a logical address space of a four node multiprocessing computer system according to one embodiment of the present invention is shown. Physical address space 502 is divided among the four nodes of the multiprocessing computer system. Local physical address space 506 is a portion of physical address space 502 allocated to node 0. Local physical address space 508 is a portion of physical address space 502 allocated to node 1. Local physical address space 510 is a portion of physical address space 502 allocated to node 2. Local physical address space 512 is a portion of physical address space 502 allocated to node 3. Each node is the home node for the portion of physical address space 502 allocated to the node. In one embodiment, the local physical address space allocated to a node is physically located within the node. Accordingly, accesses by a home node to the local physical address space allocated to that node are local accesses. For example, if node 0 accesses data stored at an address within local physical address space 506, the data access is a local transaction. Other nodes, however, may have copies of the data, which may necessitate a global coherency operation prior to accessing the data.

In the illustrated embodiment, physical address space 502 is divided equally among the four nodes. In other embodiments, physical address space 502 may be divided unequally between the nodes. It is noted that the four node multiprocessor computer system of FIG. 4 is only an illustration. Multiprocessing computer systems with any number of nodes are contemplated.

The logical address space 504 of the computer system is also illustrated in FIG. 4. In the illustrated embodiment, two logical address spaces are mapped to each local physical address space within a node. For example, local address space 514 and CMR address space 516 are both mapped to local physical address space 506. In other words an access to an offset within local address space 514 accesses the same physical memory location as an access to CMR space 516 with the same offset.

Local address space 518 and CMR address space 520 are mapped to local physical address space 508 of node 1. In a similar manner, local address space 522 and CMR address space 524 are mapped to local physical address space 510 of node 2. Lastly, local address space 526 and CMR address space 528 are mapped to local physical address space 512 in node 3.

Figure 5:
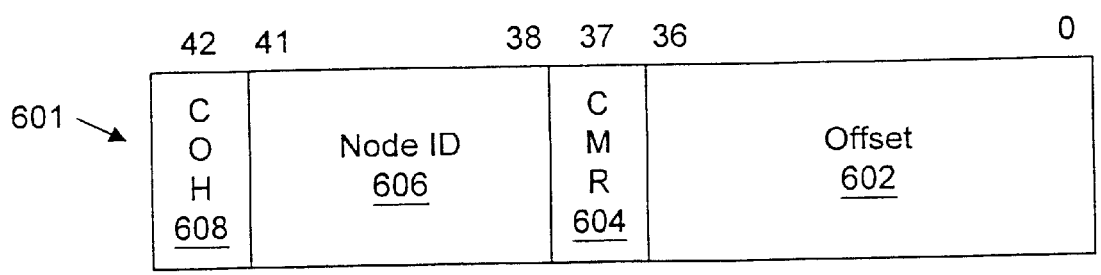
FIG. 5 illustrates a local physical address according to one embodiment of the present invention.

Turning now to FIG. 5, a format of an address 601 of a multiprocessing system according to one embodiment of the present invention is shown. In the illustrated embodiment, address 601 includes four fields: an offset field 602, a CMR bit 604, a node ID field 606 and a coherency field 608 computer. Offset field 602 identifies a page within an address space and an offset within the page. In the illustrated embodiment, offset field 602 is 37 bits. In one embodiment, the upper four bits of offset field 602 are reserved. As discussed above, CMR bit 604 identifies a logical address space within a node. In one embodiment, the CMR bit identifies either a local address space or a CMR space. In one particular embodiment, the logical address space and the CMR space are mapped to the same physical address space. Accordingly, a memory controller of a processor ignores the CMR bit. System interface 24, however, uses the CMR bit to determine whether an address translation is necessary prior to a global transaction, such as a coherency operation. Node ID field 606 identifies the home node of the address. In the illustrated embodiment, node ID field 606 is four bits. Accordingly, a system employing the illustrated address format can accommodate 16 nodes. If node ID field 606 identifies the requesting node, the address is a local physical address and accesses to the memory location are local. Alternatively, if node ID field 606 identifies a remote node, the address is a global address and accesses to the memory location are global. Coherency field 608 indicates whether the address is in a coherent memory address space or a non-coherent address space. The non-coherent memory address space stores data that is not cached, such as I/O data. In one embodiment, the non-coherent address space occupies half the address space of the multiprocessing computer system. In one particular embodiment, the non-coherent address space occupies the most significant half of the system address space.

Figure 6:
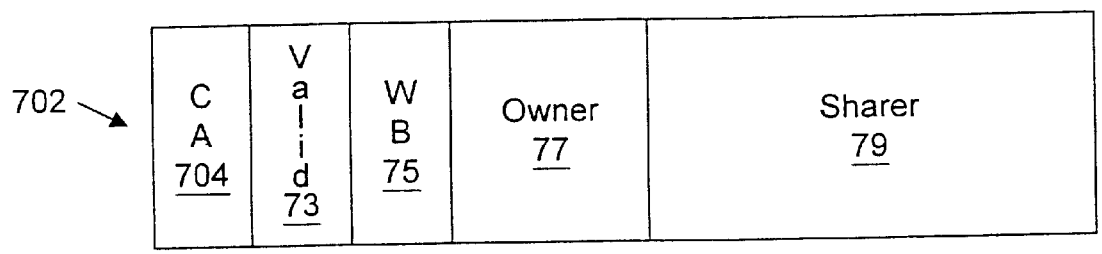
FIG. 6 illustrates of a directory entry according to one embodiment of the present invention.

Turning now to FIG. 6, an alternative format for a directory entry 702 according to one embodiment of the present invention is shown. Valid field 73, write back field 75, owner field 77 and sharer field 79 are similar to those discussed above in reference to FIG. 2A. Directory entry 702 may be employed in one embodiment of directory 66. Other embodiments of directory 66 may employ dissimilar directory entries. Directory entry 702 includes a COMA access (CA) bit 704. When set, the COMA access bit indicates that a COMA access has been made to the coherency unit that corresponds to the directory entry. Alternatively, when the COMA access bit is clear, it indicates that only NUMA accesses have been made to the coherency unit that corresponds to the directory entry.

If only NUMA accesses have been made to a particular coherency unit, a translation from a global address to a local physical address is not required when a reply is made to a coherency operation. Alternatively, if a COMA access to a coherency unit has been made, shadow copies of data may be stored, in one or more nodes, at a local physical address which is a translation of the global address. Accordingly, when a demand is made to a coherency operation that has been accessed in COMA mode, the slave node typically must translate the global address to a local physical address. In one embodiment, a bit within a demand to a coherency operation indicates whether the COMA access bit within the directory entry is asserted. Based upon the state of this bit, the node that receives the reply may determine whether a translation of the global address is required. In an alternative embodiment, a control signal can be asserted which indicates whether the COMA access bit of a directory entry is asserted.

For example, a node may request read-to-own (RTO) access rights to a coherency unit. In response to the RTO request, the home node may invalidate any copies of the data within the coherency unit in other nodes. In one embodiment, a bit within the invalidate demand indicates whether any nodes are storing the data within the coherency unit in COMA mode. If data is stored in COMA mode, the global address of the invalidate demand is translated to a local physical address (if data is stored in NUMA mode on that node, the translation may be a unity translation) and the data corresponding to the translated local physical address is invalidated. If data is only stored in NUMA mode in the system, a special invalidate command that indicates that no translation is required may be sent to the nodes. In this manner, the latency associated with the translation from the global address to local physical address may be eliminated.

In an alternative embodiment, directory 66 stores information indicative of which nodes are storing data in COMA mode and which nodes are storing data in NUMA mode. In this manner, translation invalidate commands may be sent to the nodes storing data in COMA mode, and invalidate commands specify no translation may be sent to nodes storing data in NUMA mode.

It is noted, that the COMA access bit of a directory entry may be asserted when no COMA data is stored in any of the nodes of the multiprocessing system. For example, a COMA access may be made to data within a particular coherency unit. The COMA access causes the COMA access bit of the directory entry corresponding to the coherency unit to be asserted. Subsequently, the COMA access data is discarded or invalidated by the node storing the COMA access data. In this embodiment, the COMA access bit may still be asserted and translations from a global address to a local physical address may be unnecessarily performed during a coherency operation. In an alternative embodiment, the COMA bit may be promptly reset when all COMA data within the multi-processing computer system has been invalidated. Another example of unnecessary GA2LPA lookups is for a system where one node stores a coherence unit in COMA mode and the other nodes store it in NUMA mode. This scheme will cause a GA2LPA lookup in all nodes, even though only the node in COMA mode required the lookup.

Figure 7:
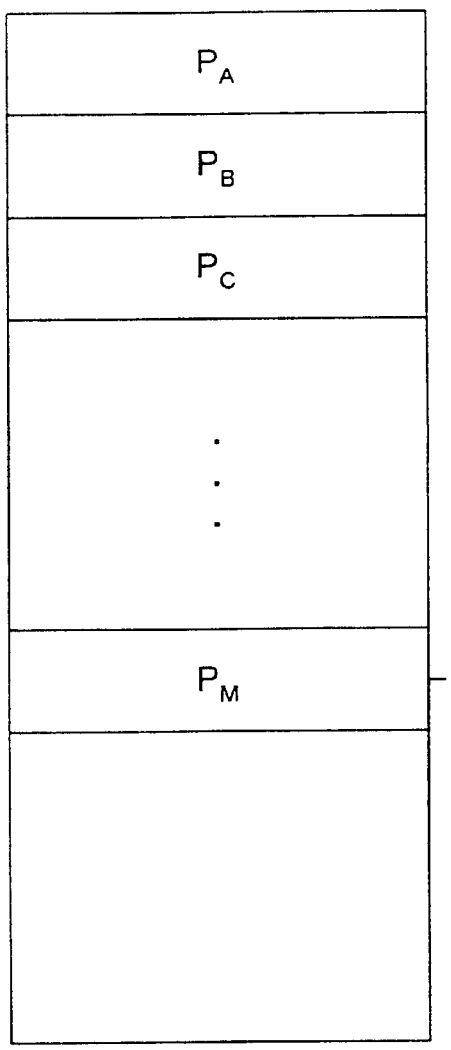
FIG. 7 is a block diagram illustrating a list of free memory and a list of CMR memory.
Figure 7:
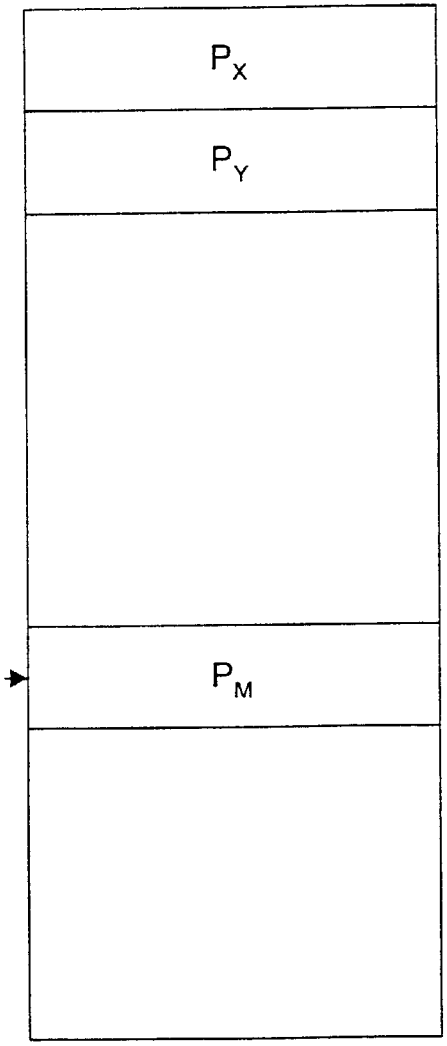

Turning now to FIG. 7, a diagram illustrating a free memory list 802 and a CMR list 804 is shown. As discussed above, in one embodiment, two logical address spaces (local address space and CMR space) are mapped to the local physical address space of a node. In one particular embodiment, a list of free memory space 802 is maintained for each node. Free memory list 802 contains addresses of pages within the local memory that have not been allocated for data storage. When a processor needs data space in local memory, the processor stores the data to a page listed in the free memory list 802 and removes the address of the page, or pages, to which the data is stored from free memory list 802.

In one embodiment, a portion of the free memory of a node is allocated as free CMR space. CMR list 804 stores the addresses of pages of unallocated memory designated as CMR space. When the system needs to store data to CMR space, the system stores the data to a page within CMR list 804 and removes the address of the page from CMR list 804. The system allocates CMR space by moving addresses of pages from free list 802 to CMR list 804. As illustrated by reference numeral 806, an address of a page in free memory list 802 may be moved to CMR list 804 to allocate a page of local memory as CMR address space.

Figure 8:
FIG. 8 is a block diagram illustrating an organization of a local memory and the mapping of pages within the local memory to entries in a local physical address to global address translation table.
Figure 8:
Figure 8:

Turning now to FIG. 8, an organization of a local physical address space and a local physical address to global address (LPA2GA) translation table is shown. In some embodiments, the LPA2GA translation table of a node includes an entry for each page within the local physical address space of that node. As the size of the local physical address space increases, the size of the LPA2GA translation table also increases. As the size of the LPA2GA table increases, the access time of the table also increases. As the access time increases, it becomes impracticable to access the entire LPA2GA table. One alternative is to implement the LPA2GA translation table as a cache backed by memory. The most recently accessed translations may be stored in cache and the entire LPA2GA table stored in memory. This decreases the access time of the translation table if a translation is in the cache. However, cache misses are fairly costly in terms of latency. Additionally, the complexity of the LPA2GA translation table is substantially increased.

In an alternative embodiment illustrated in FIG. 8, several pages of local physical address space are mapped to one entry of LPA2GA translation table 104. In the illustrated embodiment, four pages of local physical address space are mapped to one entry of LPA2GA translation table 104. For example, in the illustrated embodiment, page 802, page 808, page 814 and page 820 of local physical address space 506 are mapped to entry 826 of LPA2GA translation table 104. Prior to allocating a page of local memory as a CMR page, the node verifies that the corresponding LPA2GA translation table entry that corresponds to that page is available. If the entry is not available, the page is not allocated as CMR space and a different page is selected from the free list. In a different embodiment, as discussed above in reference to FIG. 7, pages are allocated as CMR space by moving page addresses from free memory list 802 to CMR list 804. Prior to moving a page address from free list 802 to CMR list 804, it is verified that the LPA2GA translation table entry that corresponds to that page is available.

In the illustrated embodiment, only one of the four pages that map to an entry of LPA2GA translation table 104 may be allocated as CMR space. For example, assume that page 802 is allocated as CMR space. If the node then attempts to allocate page 808 as CMR space, the node will find that entry 826 currently stores a translation for page 802. Accordingly, the node will not allocate page 808 as CMR space and choose another page such as page 804 to allocate as CMR space. If entry 828 is available (i.e., pages 810, 816 and 822 are not allocated as CMR space), then page 804 will be allocated as CMR space and entry 828 is marked as unavailable. Subsequently, page 810, 816 and 822 cannot be allocated as CMR space. A translation may be stored to entry 828 at a later time (e.g., when a shadow page is stored to the page).

In other embodiments, more or less pages may be mapped to an entry of LPA2GA translation table 104. For example, eight pages of local physical address space may be mapped to one entry of LPA2GA 104.

In the above manner, the size of LPA2GA translation table 104 may be reduced. For example, if four pages are mapped to each entry, the size of LPA2GA translation table 104 is one quarter the size of a conventional LPA2GA translation table. By reducing the size of LPA2GA 104, the entire LPA2GA table may be maintained in a fast memory (e.g., an SRAM look-up table) without the need for a cache. The circuitry of the LPA2GA table is also reduced and the latency associated with a cache miss is eliminated.

In one embodiment, the allocation of memory space as CMR space is performed by software (e.g., the operating system of the node). In one particular embodiment, software verifies that the entry of LPA2GA translation table 104 that corresponds to a page is available prior to allocating that page of CMR space. A valid bit within the translation table entries of may be used to indicate that an entry is available or unavailable.

The above described system limits the amount of memory that may be allocated as CMR space. For example, if four pages are mapped to each LPA2GA translation table entry, a maximum of 25% of local memory may be allocated as CMR space. Further, 100% utilization of the maximum available CMR space is unlikely. It is reasonable to assume that at least 75% of the maximum available space may be utilized, which is typically sufficient for CMR space.

Figure 9:
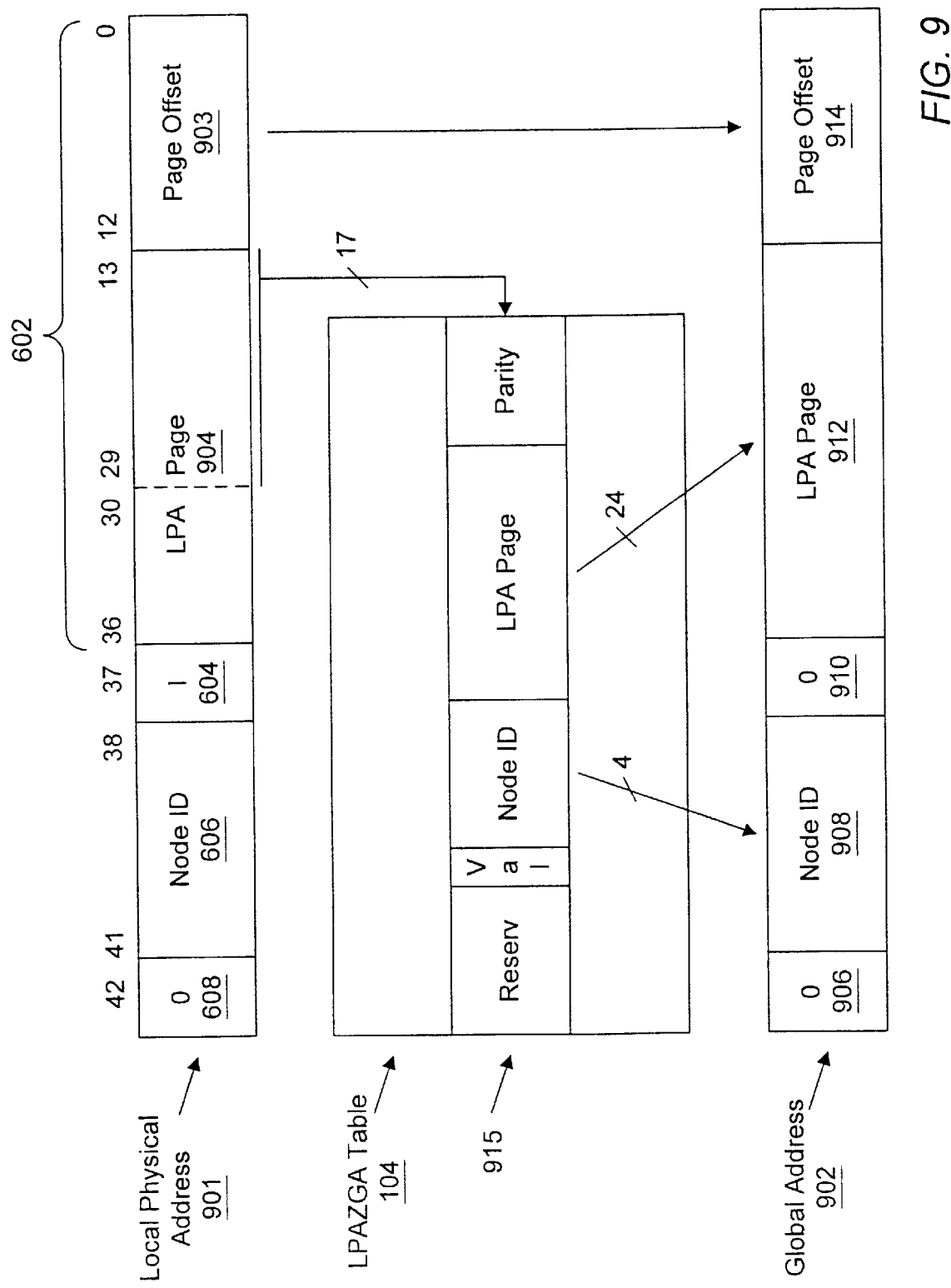
FIG. 9 is a diagram illustrating the translation of a local physical address to a global address according to one embodiment of the present invention.

Turning now to FIG. 9, a translation of a local physical address to a global address according to one embodiment of the present invention is shown. In the illustrated embodiment, eight pages of local memory are mapped to each entry in LPA2GA translation table 104. As discussed above in reference to FIG. 8, mapping multiple pages of local memory to one LPA2GA table entry reduces the size of the LPA2GA table. In the illustrated embodiment, the LPA2GA table has 128 k entries for 1M pages of local physical memory.

LPA address 901 is substantially the same as the address discussed above in reference to FIG. 5. LPA address 901 includes coherent field 608, node ID field 606, CMR bit 604 and offset field 602. In the illustrated embodiment, offset field 602 is divided into a page offset field 903 and an LPA page field 904. LPA page field 904 identifies a page of the local memory assigned to the node identified by node ID field 606. In one embodiment, the most significant four bits of LPA page field 904 are reserved. Accordingly, LPA page field 904, which is 24 bits including the reserved bits, may address up to 1M pages per node. Page offset field 903 identifies a byte, or word, within a page. In the illustrated embodiment, page offset field 903 is 13 bits and each page is accordingly 8 k bytes (or 8 k words).

LPA2GA table 104 is addressed by the 17 least significant bits of LPA page field 904. It is noted that in other embodiments, LPA2GA table 104 may be addressed by more or less bits. For example, if four pages of physical memory were mapped to each LPA2GA entry, the LPA2GA table may be addressed by 18 bits of LPA page field 904.

Figure 10:
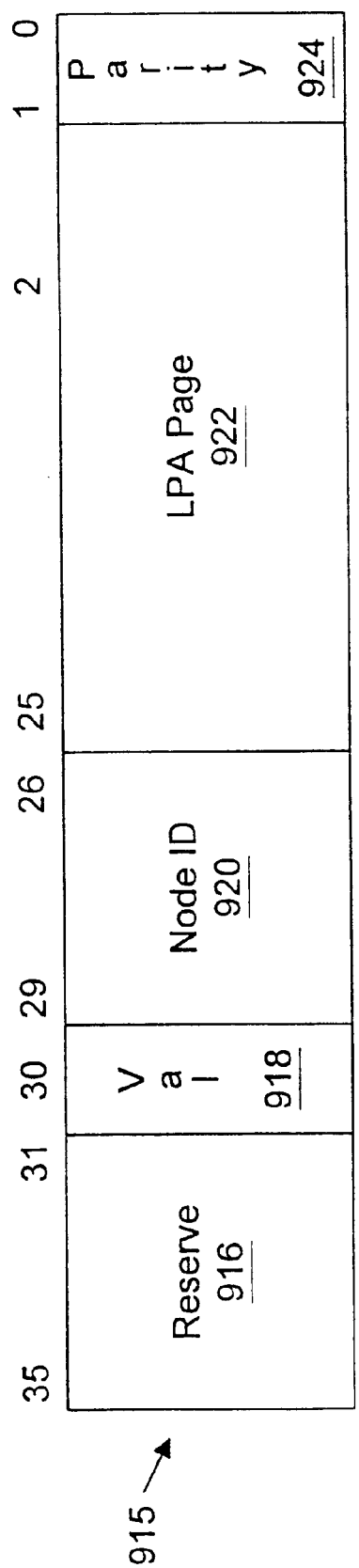
FIG. 10 illustrates an entry of a local physical address to global address translation table according to one embodiment of the present invention.

The format of LPA2GA table entry 915 according to one embodiment is illustrated in FIG. 10. LPA2GA table entry 915 includes a reserve field 916, a valid bit 918, a node ID field 920, a LPA page field 922 and a parity field 924. In other embodiments, a LPA2GA table entry may include additional fields or may omit fields included in table entry 915. Additionally, the fields may include more or less bits than the fields illustrated in FIG. 10. In the illustrated embodiment, reserve field 916 includes five reserve bits. Valid bit 918 indicates whether the corresponding table entry stores valid translation data. If the valid bit is clear, the table entry does not contain a valid translation and is available to store a translation. Node ID field 920 identifies the home node within the multiprocessing system that corresponds to the address. In the illustrated embodiment, node ID field 920 is four bits. Accordingly, sixteen nodes may be accommodated. LPA page field 922 identifies a page within the home node identified by node ID field 920. In the illustrated embodiment, LPA page field 922 is 24 bits. Accordingly, 4M pages may be accommodated. Parity field 924 stores two parity bits to verify the accuracy of the table entry. In one embodiment, the parity bits are checked by hardware each time hardware accesses a table entry, but are not checked by software accesses.

Referring back to FIG. 9, the least significant 17 bits of LPA page field 904 of local physical address 901 are used to address LPA2GA translation table 104. In the illustrated embodiment, no address tag is stored in table entry 915, even though multiple pages correspond to a table entry. As discussed above in reference to FIG. 8, only one of the pages that correspond to table entry 915 may be allocated as CMR space. Accordingly, only one translation is stored in each entry of LPA2GA table 104 and no comparisons of address tags are required.

Global address 902 includes fields substantially similar to LPA address 901. Global address 902 includes a coherent field 906, a node ID field 908, a reserve bit 910, an LPA page field 912, and a page offset field 914. Portions of global address 902 are taken directly from LPA address 901 and other portions are obtained from fields within the LPA2GA entry addressed by LPA address 901. In the illustrated example, page offset field 904 is taken directly from page offset field 903 of LPA address 901. Node ID field 920 and LPA page field 922 of the table entry addressed by LPA address 901 provide the data for node ID field 908 and LPA page field 912 of global address 902.

Figure 11:
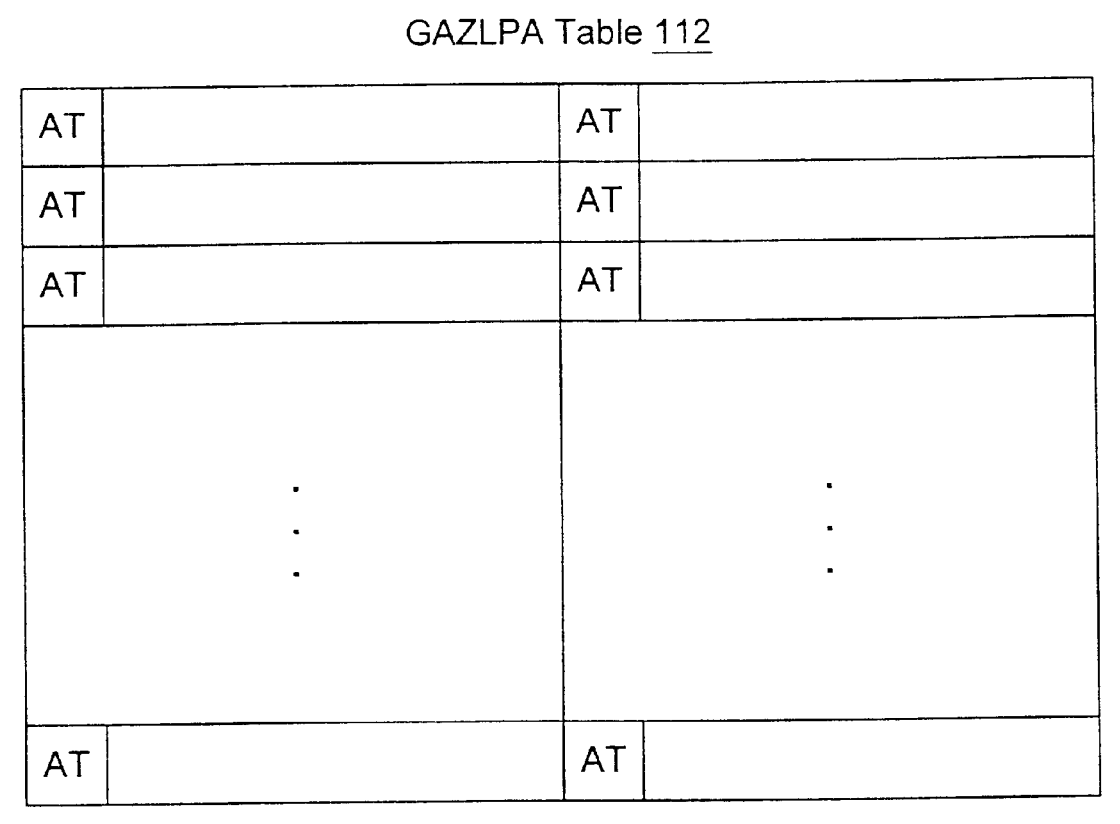

Turning now to FIG. 11, the organization of a global address to local physical address (GA2LPA) table is shown according to one embodiment of the present invention. Typically, the GA2LPA table of each node in a multiprocessing system must include one entry for each page in the multiprocessing system. For example, in a multiprocessing system with four nodes each including 1M pages of local physical address space, the GA2LPA table must include 4M entries. The access time associated with a table of that size typically adds unacceptable latency to the transaction. In one embodiment, the access time of the GA2LPA table is reduced by providing a cache to store the most recently accessed GA2LPA translations. The cache is typically backed by memory which stores the entire GA2LPA table. Unfortunately, this solution adds complexity to the GA2LPA table, requires a significant amount of RAM to store the GA2LPA table, and adds significant latency in the case of a cache miss.

In an alternative embodiment, the size of GA2LPA table 112 may be reduced by recognizing that only shadow pages need address translations. Multiple global address pages are mapped to each entry in GA2LPA table. Prior to storing data as a shadow page (i.e. storing data in a COMA manner), GA2LPA table 112 is checked to see if the entry in the table that corresponds to the global address is available. If the entry is available, the global address is translated to a local physical address using a page address from CMR list 804 discussed above in reference to FIG. 7. Alternatively, if the corresponding entry in GA2LPA table 112 is unavailable (i.e., the entry is storing a translation), a shadow copy of the data is not stored and the data is stored in NUMA mode. Accordingly, there is some probability that a node may not be able to store data in COMA mode. This probability may be reduced by expanding the size of GA2LPA table 112 or making GA2LPA table 112 more associative.

In the embodiment illustrated in FIG. 11, a two-way set associative GA2LPA translation table 112 is shown.

Accordingly, two pages associated with one entry of GPA2LPA table 112 may be stored as shadow pages. If one way of an entry is occupied, data may still be stored as to a shadow page and the conversion entered in the second way of the entry. If both entries contain valid translations, the page may not be stored as a shadow page and is stored in NUMA mode.

As discussed above, only pages which have a valid translation in the GA2LPA table are converted to shadow pages. If a global address received as part of a request does not have a corresponding translation in the GA2LPA table, then no shadow page exists that corresponds that global address. Accordingly, no GA2LPA translation is required. Any data that corresponds to the global address on that node is stored in NUMA mode and accordingly the global address may be used to access the data. In other words, the absence of a translation in GA2LPA table 112 provides information to the node that the page has only been stored in NUMA mode on that node.

As discussed in more detail below, a portion of the global address is used to address an entry of GA2LPA table 112. Because multiple pages are mapped to one entry, a portion of the global address (typically more significant bits than the bits used to address the entry) is compared to address tags stored with each entry. If the bits of the global address match either of the address tags, then GA2PLA table 112 stores a translation for the address and the translation data is used to form a local physical address. Alternatively, if the address tags do not match the bits of the global address, no translation exists for that global address and the global address is used to address any data on the node.

In other embodiments, other organizations for GA2LPA table 112 may be implemented. For example, GA2LPA table 112 may be organized as a four-way set associative table. Generally speaking, increasing the associatively of the table decreases the probability of not being able to store data in COMA mode. For example, if a four-way set associative GA2LPA table is used and the table is twice the size of the corresponding LPA2GA table, the probability of available space in the GA2LPA table is 98%, assuming that 75% of the available CMR memory is used. If only 50% of the available CMR space is used, the probability of finding available space in the GA2LPA table is 99.6%.

One possible organization of a four-way set associative cache is to put the address tags of all four ways in one word. This address tag word is accessed first. If none of the address tags match the bits of the global address, the address does not have a GA2LPA translation and no more accesses to GA2LPA table 112 are required. If one address tag matches the bits of the global address, the way that corresponds to the global address may be determined and the translation information corresponding to the way accessed. Alternatively, the four-ways may be sequentially accessed and the address tags compared to the bits of the global address. The same strategies may be used with other table organizations, such as a two-way set associative table.

Figure 12A:
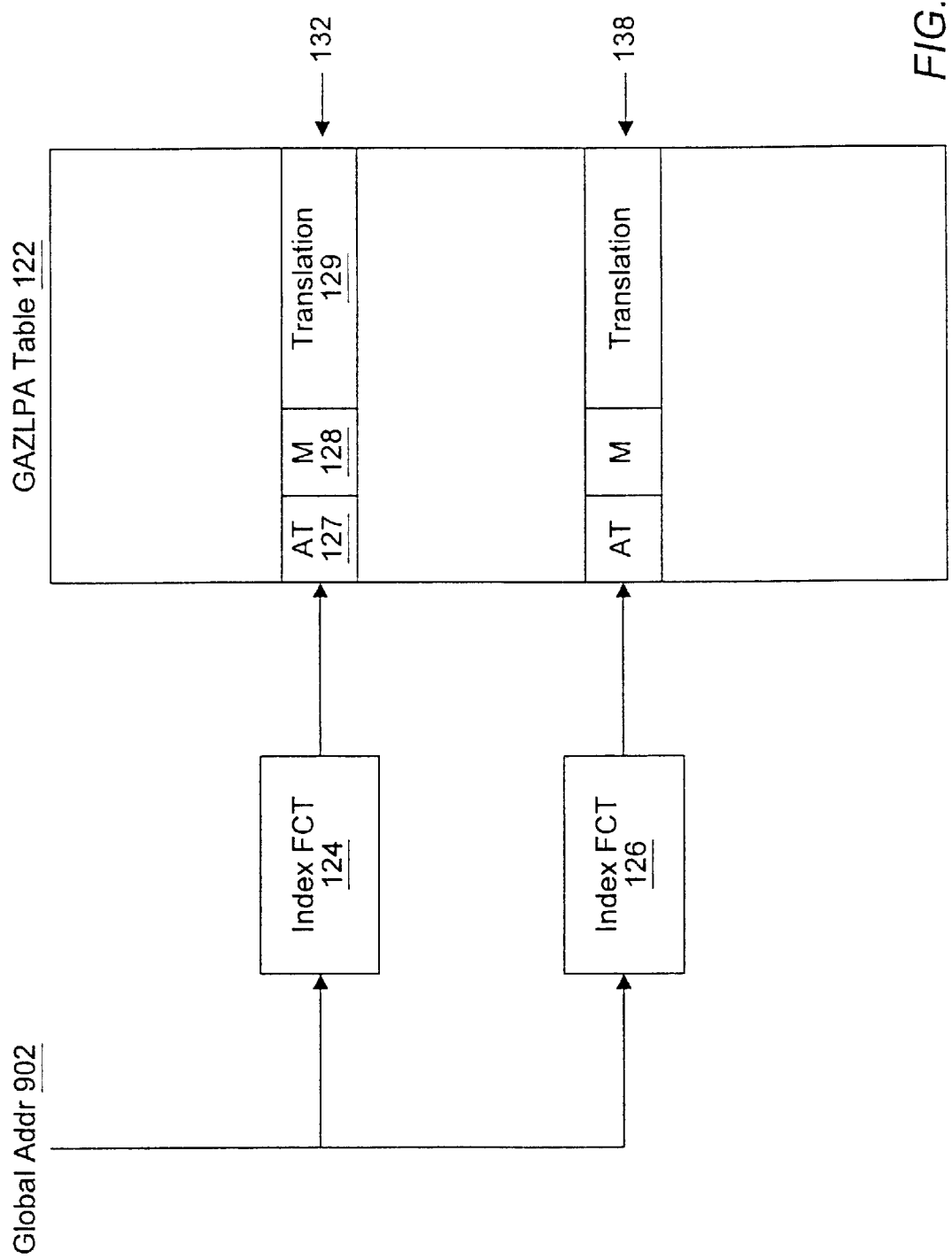
FIG. 12A is a block diagram illustrating an alternative organization of a global address to local physical address translation table according to one embodiment of the present invention.

Turning now to FIG. 12A, an alternative organization of a GA2LPA table is shown according to one embodiment of the present invention. GA2LPA table 122 is organized as a skewed-associative cache. Index function 124 and index function 126 convert the global address into two different look-up addresses for GA2LPA table 122. The address tags stored in the entries addressed by the look-up addresses are compared to some portion of the global address. The comparison must include enough bits such that the combination of the lookup location and the address tag uniquely identifies one GA address. If the address tag of an entry matches the global address, the translation data stored in that entry is used to form the local physical address. Alternatively, if neither address tag matches the global address, the global address is used to access the data. In other words, if neither entry stores a GPA2LPA translation for that global address, then the data that corresponds to the global address is stored in NUMA mode within the node and the data is accessed using the global address.

The look-up address generated by index function 126 for one address may be identical to the look-up address generated by index function 124 for a different address. In one embodiment, the look-up address generated by index function 124 is a subset of the address bits of the global address. In one embodiment, the look-up address generated by index function 126 may be the bit-wise exclusive OR of a plurality of bits within the global address.

Each entry in GA2LPA table 122 includes an address tag field 127, a mode bit 128 and a translation field 129. As discussed above, address tag field 127 stores the address tag of the global address that corresponds to an entry. Mode bit 128 is required to prevent false matches. The mode bit indicates whether the entry of the stored translation was derived using index function 124 or index function 126. The address tags and mode bit must match in order to select a table entry. Translation field 129 stores the data necessary to generate a local physical address from the global address. Translation field 129 is discussed in more detail below in reference to FIG. 13.

In one embodiment, when storing translations to GA2LPA table 122, the translation data is first attempted to be stored in the entry addressed by index function 124 (referred to herein as the primary entry). If the primary entry is used by another translation, the translation information is then attempted to be stored in the entry addressed by index function 126 (referred to herein as the secondary entry). If the secondary entry is also occupied, no translation is stored for that global address and no shadow page is allocated for that global address.

Figure 12B:
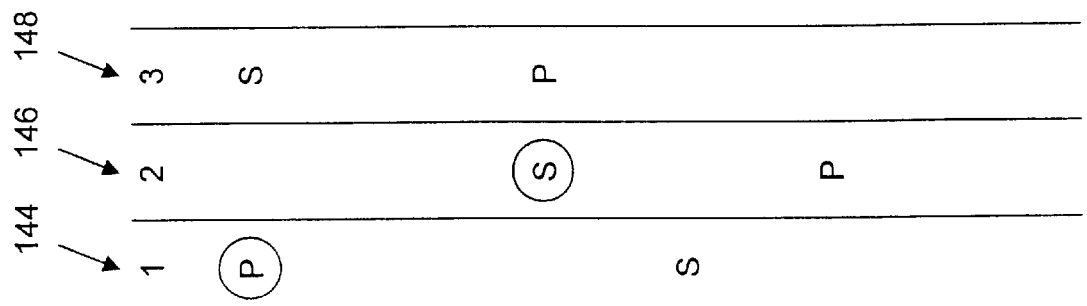
FIG. 12B is a diagram illustrating an example of realigning table entries within a global address to local physical address translation table according to one embodiment of the present invention.

Turning now to FIG. 12B, a method for maximizing utilization of tables such as GA2LPA table 122 according to one embodiment of the present invention is shown. FIG. 12B illustrates a plurality of entries 132–142 in GA2LPA table 122. Columns 144, 146 and 148 illustrate the look-up addresses for a plurality of global addresses. Each global address has a primary entry and a secondary entry in GA2LPA table 122. In the illustrated embodiment, the primary entry is identified by "P" next to the entry and a secondary entry is identified "S" next to the entry. The entry in which the translation is stored is identified by a circle around the letter identifying the entry. In one embodiment, the primary entry corresponds to the look-up address generated by index function 124 and the secondary entry corresponds to the look-up address generated by index function 126. For example, the primary entry corresponding to global address 1 is entry 132 and the secondary entry corresponding to global address 1 is entry 138. In the illustrated embodiment, the translation for global address 1 is stored in the primary entry, which is entry 132. In a similar manner, the primary entry corresponding to global address 2 is entry 140 and the secondary entry is entry 136. In the illustrated embodiment, the translation for global address 2 is stored in entry 136. The primary entry corresponding to global address 3 is 136 and the secondary entry is entry 132.

In one embodiment, the translation for global address 3 cannot be stored in GA2LPA table 122 because both entries associated with global address are 3 occupied by other translations. The primary entry associated with global address 3 (entry 136) is occupied by global address 2 and the secondary entry (entry 132) is occupied by global address 1. To improve the availability of entries in GPA2LPA table 122, the translations for either global address 1 or global address 2 may be moved to the other entry associated with that address. For example, the translation for global address 2 is stored in the secondary entry associated with global address 2 (entry 136). If the translation is moved to the primary entry (entry 140), then entry 136 is available to store the translation for global address 3. Alternatively, the translation for global address 1 could be moved from entry 132 to entry 138, which makes entry 132 available to store the translation for global address 3. In this manner, the utilization of GA2LPA table 122 may be increased.

The utilization of the table approaches the utilization of a fully associative table while maintaining a relatively simple look-up function. Only two entries need to be accessed during look-up. In other words, from the look-up standpoint, the table is similar to a two-way skewed associative cache. The utilization of the table, however, approaches the utilization of a fully associative table. In one embodiment, software performs the realignment function of moving translations between entries to make space available for new entries.

Figure 12C:
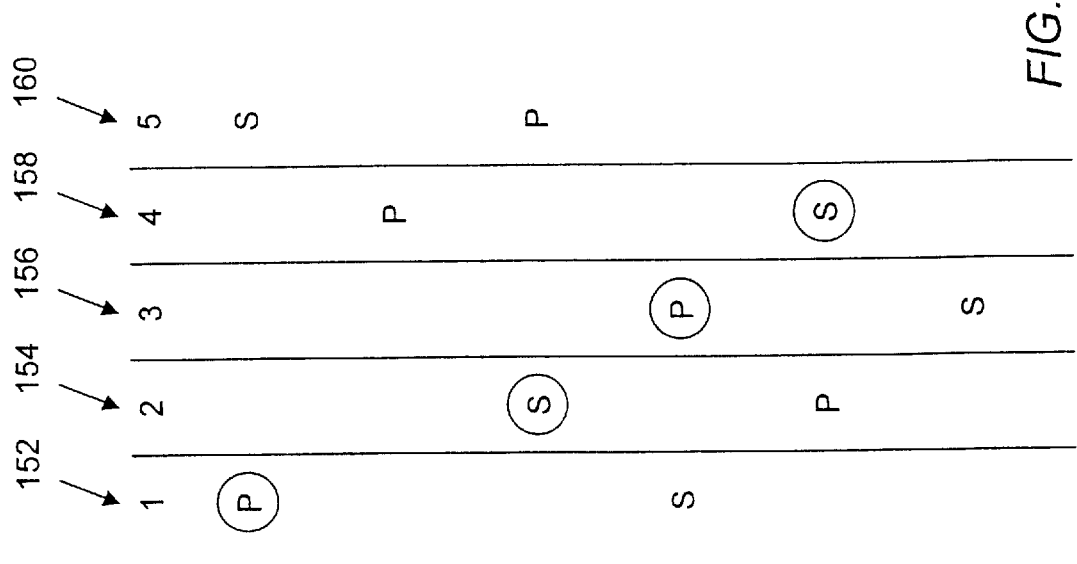
FIG. 12C is a diagram illustrating another example of realigning table entries within a global address to local physical address translation table according to one embodiment of the present invention.

Turning now to FIG. 12C, another illustration of a method for increasing the utilization of a translation table is shown. In the illustrated embodiment, the primary and secondary entries associated with five global addresses are shown in columns 152–160. The primary entry associated with global address 1 is entry 132 and the secondary entry is entry 138. The translation is stored in entry 132. The primary entry associated with global address 2 is entry 140 and the second entry is 136. The translation is stored in entry 136. The primary entry associated with global address 3 is entry 138 and the secondary entry is entry 142. The translation is stored in entry 138. The primary entry associated with global address 4 is entry 134 and the secondary entry is entry 140. The translation is stored in secondary entry 140. In a similar manner to that discussed above in reference to FIG. 12B, the translation for global address 5 cannot be stored in GA2LPA table 122 absent a method for improving the utilization of GA2LPA table 122.

The translation for global address 5 cannot be stored in the table because both the primary and secondary entries associated with global address 5, entries 136 and 132 respectively, are occupied by translations of other global addresses. The translation for global address 1 cannot be moved from entry 132 to entry 138 because entry 138 is currently occupied by the translation of global address 3. Likewise, the translation for global address 2 cannot be moved from entry 136 to entry 140 because entry 140 is occupied by the translation for global address 4. In order to make an entry available in GA2LPA table 122 for the translation of global address 5, either the entry storing the translation for global address 3 or global address 4 is moved. This allows the translation of either global address 1 or global address 2 to be moved, which allows the translation of global address 5 to be stored in GA2LPA table 122. For example, the translation for global address 3 may be moved from entry 138 to entry 142. The translation for global address 1 then may be moved from entry 132 to entry 138. The translation for global address 5 then may be stored in entry 132. Alternatively, the translation for global address 4 may be moved from entry 140 to entry 134. The translation of global address 2 may then be moved from entry 136 to entry 140 and the translation for global address 5 stored in entry 136.

The methodology illustrated in FIGS. 12B and 12C may be repeated for several iterations before an entry becomes available. Although the realignment of the GA2LPA table may be time consuming, the overhead is only incurred once for each new translation. Additionally, the realignment can occur off the critical path of the processor. In one embodiment, only one new translation can be added at one time. Although the method for increasing the utilization of a table is described above in reference to GPA2LPA table 122, it is noted that the methodology may be applied to any table that employs skewing or hashing functions.

Figure 13:
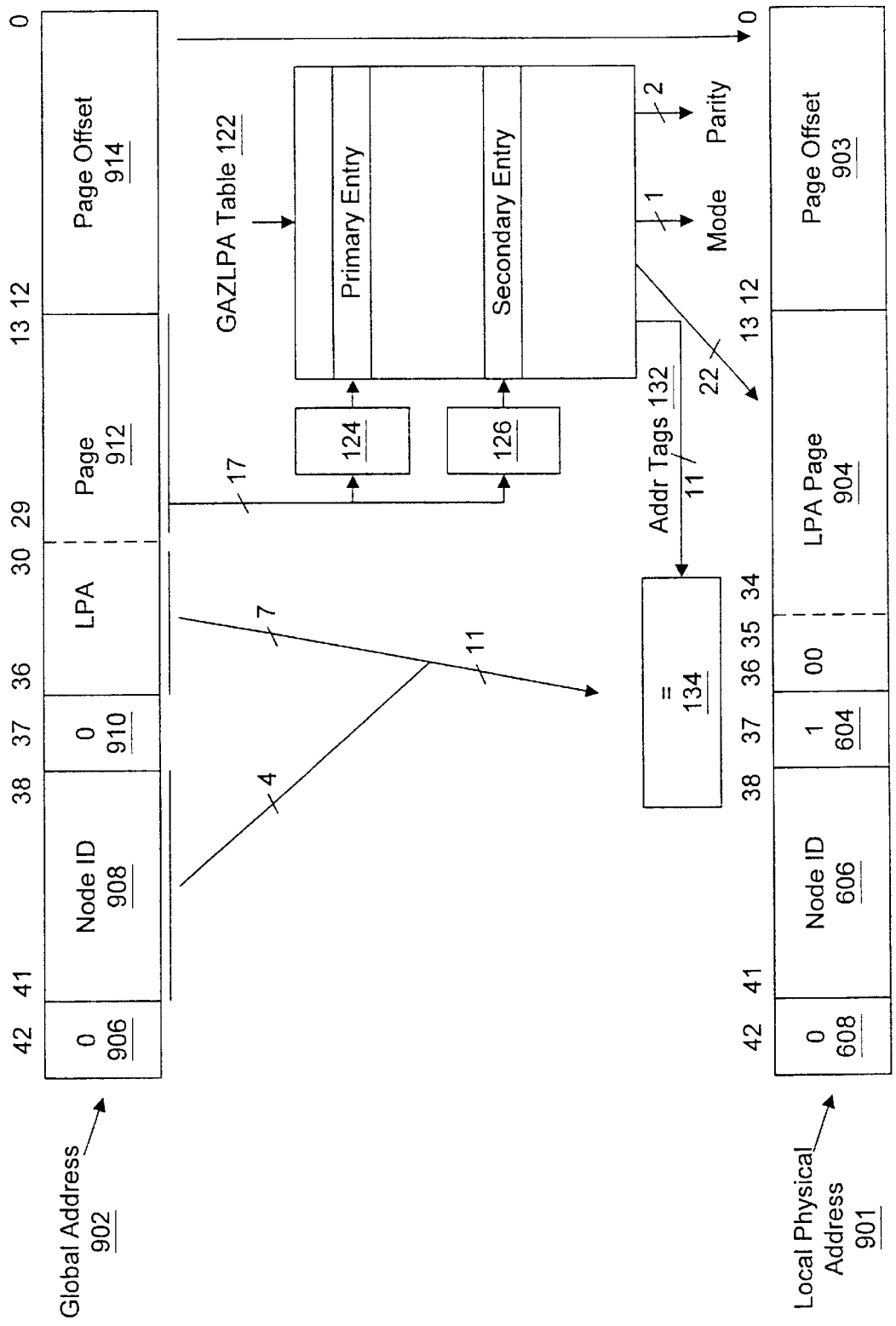
FIG. 13 is a diagram illustrating the translation of a global address to a local physical address according to one embodiment of the present invention.

Turning now to FIG. 13, a translation of a global address 902 to a local physical address 901 according to one embodiment of the present invention is shown. The fields of global address 902 and local physical address 901 are substantially similar to the fields discussed above in reference to FIG. 9. In the illustrated embodiment, page offset field 914 from global address 902 is copied to page offset field 903 of local physical address 901. Because address 901 is a local physical address, node ID field 606 identifies the home node of the local physical address. In one embodiment, CMR bit 604 is asserted in the local physical address because the local physical address identifies a shadow page of the page identified by global address 902. LPA page field 904 is obtained from an output of GA2LPA table 122.

In the illustrated embodiment, the least significant 17 bits of LPA page field 912 are provided to index function 124 and index function 126. The address tags 132 from the two entries that correspond to the look-up addresses output by index function 124 and index function 126 are compared to node ID field 908 and 7 bits of LPA page field 912 by comparator 134. If a match is found, the entry with the matching address tag outputs the translation information to LPA page field 904. In the illustrated embodiment, the two most significant bits of LPA page field 904 are always 0 to reduce the number of bits stored in each entry of GA2LPA table 122.

In the illustrated embodiment, each entry is GA2LPA table 122 includes an 11-bit address tag, a 22-bit LPA page translation, a mode bit, and two parity bits.

Figure 14A:
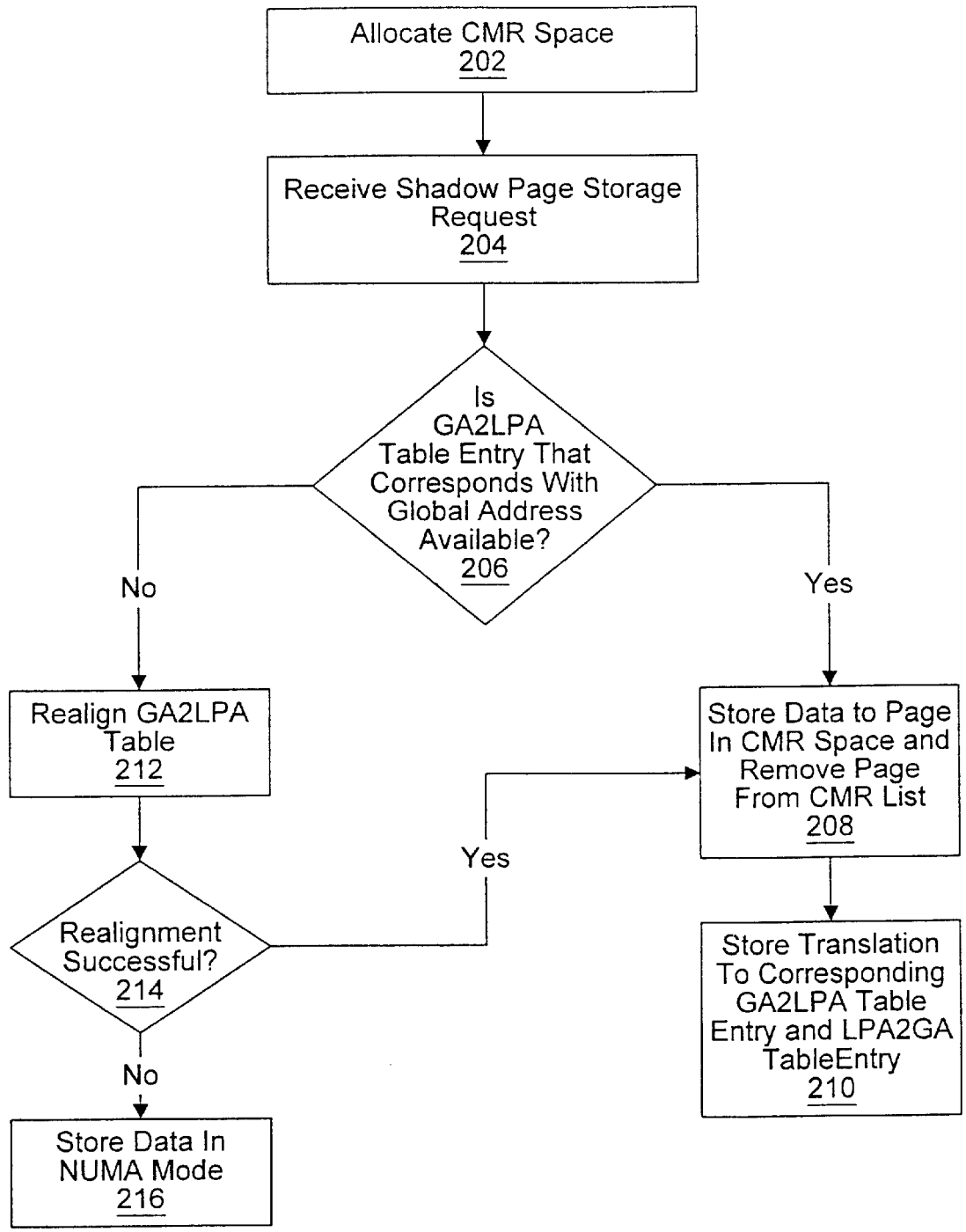
FIG. 14A is a flowchart illustrating the allocation of entries in a global address to local physical address table according to one embodiment of the present invention.

Turning now to FIG. 14A, a flowchart illustrating the storage of shadow pages and the allocation of entries within a GA2LPA table is shown. In step 202, portions of memory are allocated as CMR space. As discussed above, CMR space is used to store shadow copies of data from remote nodes. Step 202 is discussed in more detail below in reference to FIG. 14B. In step 204, a request to store a shadow copy of data (i.e., store data in COMA mode) is received. As discussed above, shadow pages are assigned a local physical address such that future accesses to the data are local rather than global. As discussed in more detail below, an entry within the GA2LPA table must be available before a node will allow a shadow page to be stored.

In decisional step 206, it is determined whether a GA2LPA table entry that corresponds with the global address of the data to be stored in the shadow page is available. In one embodiment, in order to reduce the number of entries in the GA2LPA table, multiple global addresses are assigned to each entry in the GA2LPA table. In one particular embodiment, the GA2LPA table is a set associative table such that translations of multiple global addresses that correspond to one entry may be stored. If the entry associated with the global address is available, then in step 208, the data is stored to a shadow page in the CMR space and the address of the page is removed from the CMR list.

In step 210, the translation data for translating between the global address and local physical address is stored to the appropriate entries in the GA2LPA table and the LPA2GA table.

If in decisional step 206 no entry is available in the GA2LPA table, then in step 212, the GA2LPA table may be realigned. Realignment is discussed in more detail below in reference to FIG. 14C. In step 214, it is determined whether the realignment of step 212 was successful (i.e., a table entry corresponding the address is available). If the realignment was successful, then steps 208 and 210 described above are performed. Alternatively, if the realignment of step 212 was unsuccessful, then in step 216 the data is stored in NUMA mode.

Figure 14B:
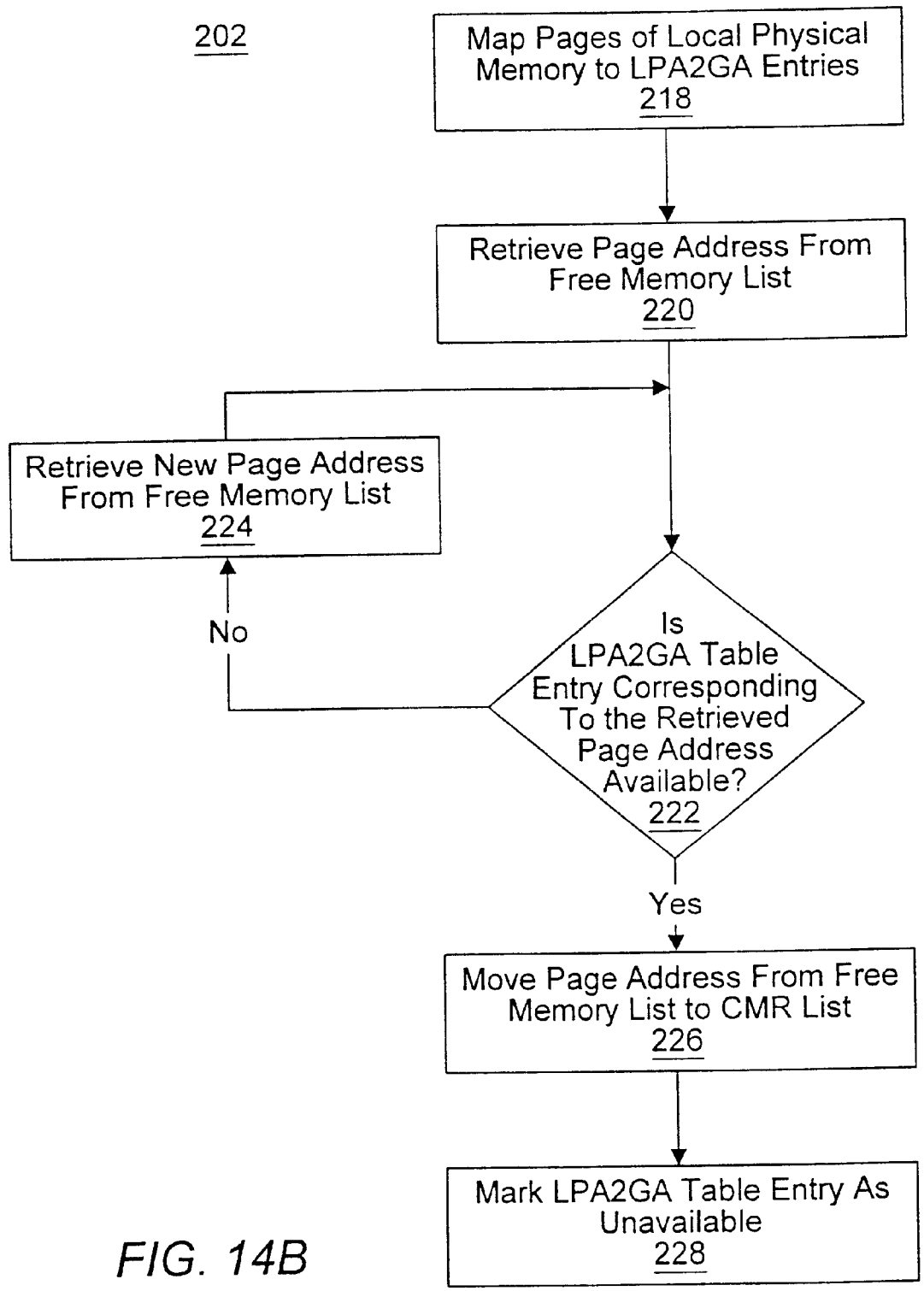
FIG. 14B is a flowchart illustrating the allocation of coherent replication memory according to one embodiment of the present invention.

Turning now to FIG. 14B, a flowchart illustrating the allocation of CMR space according to one embodiment of the present invention is shown. In step 218, the pages of the local memory of a node are mapped to entries in an LPA2GA table. In one embodiment, multiple pages of local memory are mapped to each entry in the LPA2GA table. In one particular embodiment, four pages of local memory are mapped to each entry in the LPA2GA table. Mapping multiple pages of local memory to each entry in the LPA2GA table effectively reduces the size of the LPA2GA table. However, as discussed in more detail below, pages may only be allocated in CMR space if a entry is available in the LPA2GPA table for storing the translation for that page.

In step 220, a page address from a free memory list is retrieved. In one embodiment, the free memory list is a list of addresses of pages which have not been allocated for storage. In the illustrated embodiment, CMR space is allocated by moving page addresses from the free memory list to a CMR list. Accordingly, the CMR list stores page addresses of available pages allocated as CMR space.

In decisional step 222, it is determined whether the LPA2GA table entry that corresponds to the retrieved page address is available. As discussed above, in one embodiment, multiple page addresses are mapped to one entry in the LPA2GA table. If an entry stores a translation for a page mapped to the same entry, the entry is not available. If the entry is not available, then in step 224, a new page address is retrieved from the free memory list. Steps 222 and 224 are repeated until a page address from the free memory list with an available entry in LPA2GA table is retrieved.

In step 226, the page address for the retrieved address with an available LPA2GA table entry is moved from the free memory list to the CMR list. In step 228, the LPA2GA table entry that corresponds to the retrieved page address is marked as unavailable. In another alternative embodiment, steps 226 and 228 may be performed in parallel. In another alternative embodiment, step 228 may be performed before step 226. In one embodiment, a table entry is marked as unavailable by asserting a valid bit within the table entry.

Figure 14C:
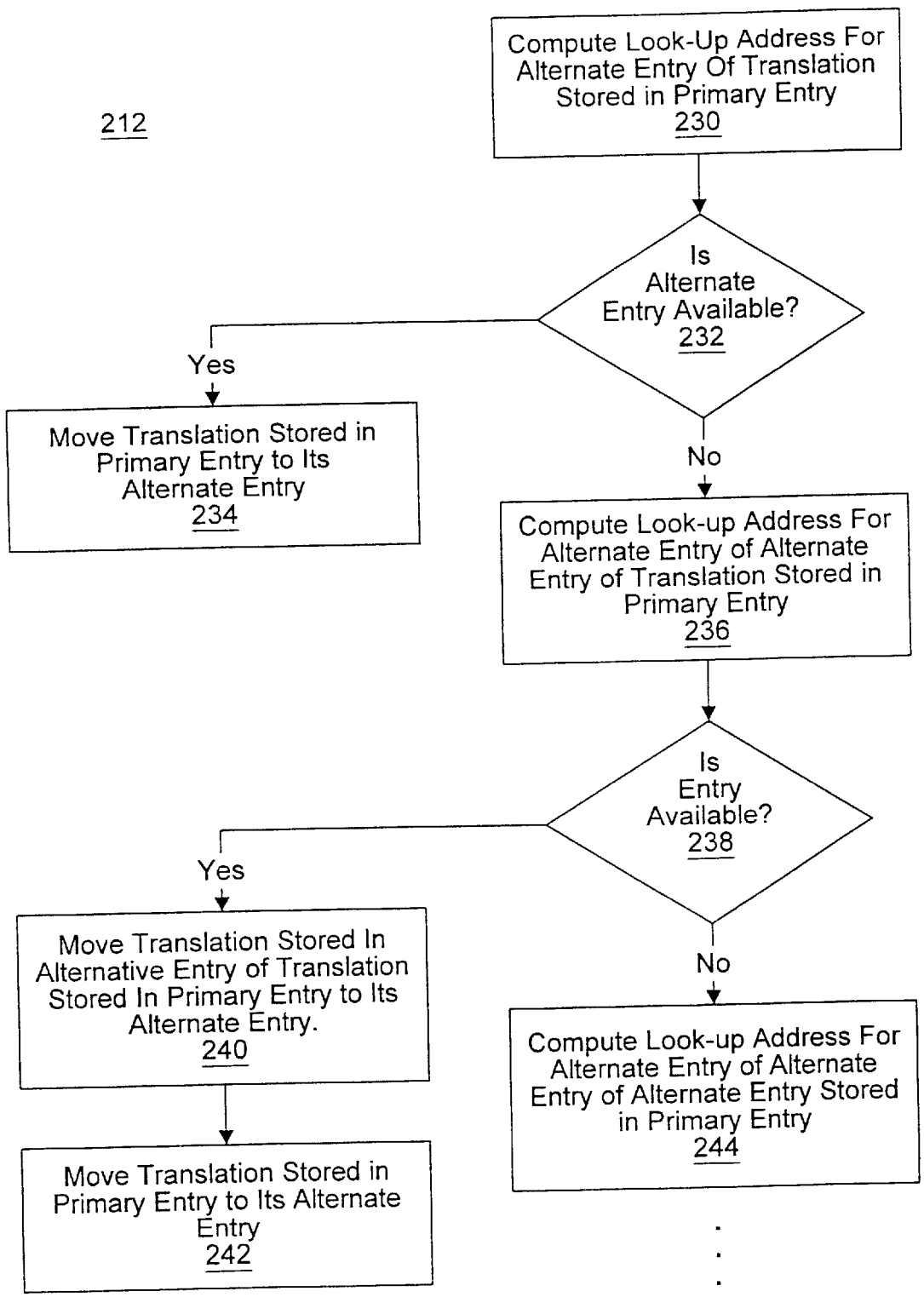
FIG. 14C is a flowchart illustrating the realignment of entries in a global address to local physical address table according to one embodiment of the present invention.

Turning now to FIG. 14C, a flowchart illustrating the realignment of entries in a GA2LPA table according to one embodiment of the present invention is shown. It is noted, that the realignment of a GA2LPA table is shown for a illustrative purposes only. The same methodology may be used for any table employing primary and secondary entries for an address, such as a table employing skewed associativity or hashing functions. The flowchart contemplates a table in which each address is mapped to a primary entry and a secondary entry. If both the primary entry and secondary entry of an address are occupied by other translations, the entries are realigned by moving the translation from the primary entry to the secondary entry or from the secondary entry to the primary entry. In this manner, an entry may be made available for storing a new translation. Several iterations of realignment may be required before an entry is made available.

FIG. 14C contemplates an instance in which both the primary and secondary entries of an address are occupied. In FIG. 14C, a flowchart for the realignment of a GA2LPA table to make the primary entry of a new translation available is shown. It is noted, that the same methodology may be used to realign the GA2LPA table such that the secondary entry of the new translations is available. It is contemplated, that the realignment to make the primary entry available and the realignment to make a secondary entry available are performed concurrently. The first entry made available is used for the translation and the realignment is suspended.

In step 230, the look-up address for the alternate entry of the translation stored in the primary entry is computed. For example, if the primary entry is a secondary entry of another translation, the look-up address of the primary entry of the translation is computed. In one embodiment, a mode bit indicates whether an entry corresponds to the primary or secondary entry of the address. The look-up address of the alternate entry may be determined by applying the inverse of the index function used to generate the entry address to obtain the original global address and then applying another index function. The mode bit may indicate that the translation stored in the primary entry is the secondary entry for the translation. The inverse of the index function used to generate the secondary entry look-up address is applied to the entry address, which outputs the global address of the translation. The primary index function is then applied to the global address to compute the look-up address of the primary entry of the translation.

In step 232, it is determined whether the alternate entry is available. If the alternate entry is available, then in step 234, the translation stored in the primary entry is moved to its alternate entry. The primary entry is now available to store a new translation.

Alternatively, if the alternate entry of the translation stored in the primary entry is unavailable, then in step 236, the alternate entry of the alternate entry of the translation stored in the primary entry is computed. It is determined whether this entry is available in decisional step 238. If the entry is available, then in step 240, the translation stored in the alternate entry of the translation stored in the primary entry is moved to its alternate entry. The alternate entry for the translation stored in the primary entry is now available. In step 242, the translation stored in the primary entry is moved to its alternate entry. The primary entry is now available to store the new translation.

If the translation in step 238 is not available, the look-up address for the alternate entry of the alternate entry of the alternate entry stored in the primary entry is computed. Steps similar to steps 238–244 are repeated until the table has been realigned to make space available for the new translation or until a predetermined number of iterations has been performed without successfully realigning the table.

Although SMP nodes 12 have been described in the above exemplary embodiments, generally speaking an embodiment of computer system 10 may include one or more processing nodes. As used herein, a processing node includes at least one processor and a corresponding memory. Additionally, circuitry for communicating with other processing nodes is included. When more than one processing node is included in an embodiment of computer system 10, the corresponding memories within the processing nodes form a distributed shared memory. A processing node may be referred to as remote or local. A processing node is a remote processing node with respect to a particular processor if the processing node does not include the particular processor. Conversely, the processing node which includes the particular processor is that particular processor's local processing node.

Numerous variations and modifications will become apparent to those skilled in the art once the above disclosure is fully appreciated. It is intended that the following claims be interpreted to embrace all such variations and modifications.

What is claimed is:

1. A look-up table configured to store data corresponding to an input address comprising:
   a plurality of entries for storing said data; and
   an address circuit, wherein the circuit is configured to:
      determine a first address corresponding to the input address, wherein the first address corresponds to a first entry of the plurality of entries;
      determine a second address corresponding to the input address, wherein the second address corresponds to a second entry of the plurality of entries; and
      determine an alternate address corresponding to a data stored in the first entry, in response to detecting the first entry and the second entry are unavailable.

2. The table of claim 1, wherein said table is configured to:
   store a first data corresponding to said input address to the first entry if the first entry is available; and
   store the first data to the second entry in response to detecting the first entry is unavailable.

3. The table of claim 2, wherein the alternate address corresponds to an alternate entry of the entries, and wherein in response to detecting the first entry and the second entry are unavailable, the table is configured to move the data stored in the first entry to the alternate entry and store the first data to the first entry.

4. The table of claim 1, wherein if an alternate entry corresponding to the alternate address is unavailable, the circuit is configured to determine a second alternate address corresponding to a data stored in the alternate entry.

5. The table of claim 1, wherein the first address is a subset of the bits of the input address.

6. The table of claim 1, wherein the second address is a bit-wise exclusive-oring of a subset of the bits of the input address.

7. The table of claim 1, wherein the input address is a global address and the data is a local physical address.

8. A look-up table configured to store and realign data comprising:
   a plurality of entries configured to store data; and
   a realignment unit, wherein said unit is configured to:
      receive an input address;
      compute a first address corresponding to the input address, wherein the first address corresponds to a first entry of the entries;
      compute a second address corresponding to the input address, wherein the second address corresponds to a second entry of the entries; and
      realign data stored in the entries, in response to detecting the first entry and the second entry are unavailable.

9. The table of claim 8, wherein said unit is configured to realign the data by:
   computing an alternate address corresponding to a third entry of the entries; and
   moving a first data stored in the first entry to the third entry.

10. The table of claim 9, wherein in computing the alternate address, the realignment unit is configured to:
    determine a first index function which was applied to an original look-up address corresponding to the first data;
    apply an inverse of the first index function to the first address to obtain the original look-up address; and
    apply a second index function to the original look-up address.

11. A method of storing and retrieving data in a look-up table comprising:
    receiving an input address;
    determining a first address corresponding to the input address, wherein the first address corresponds to a first entry of the table;
    determining a second address corresponding to the input address, wherein the second address corresponds to a second entry of the table; and
    determining an alternate address corresponding to a data stored in the first entry, in response to detecting the first entry and the second entry are unavailable.

12. The method of claim 11, further comprising:
    storing a first data corresponding to the input address to the first entry if the first entry is available; and
    storing the first data to the second entry in response to detecting the first entry is unavailable.

13. The method of claim 12, wherein the alternate address corresponds to an alternate entry of the entries, and wherein in response to detecting the first entry and the second entry are unavailable, the method further comprises moving the data stored in the first entry to the alternate entry and storing the first data to the first entry.

14. The method of claim 11, further comprising determining a second alternate address corresponding to a data stored in the alternate entry, in response to detecting an alternate entry corresponding to the alternate address is unavailable.

15. The method of claim 11, wherein the first address is a subset of the bits of the input address.

16. The method of claim 11, wherein determining the second address comprises performing a bit-wise exclusive-oring of a subset of the bits of the input address.

17. The method of claim 11, wherein the input address is a global address and the data is a local physical address.

18. A method for increasing utilization of a table which includes a plurality of entries configured to store data, said method comprising:
    receiving an input address;
    determining a first address corresponding to the input address, wherein the first address corresponds to a first entry of the table;
    determining a second address corresponding to the input address, wherein the second address corresponds to a second entry of the table; and
    realigning data stored in the entries, in response to detecting the first entry and the second entry are unavailable.

19. The method of claim 18, wherein realigning said data comprises:
    computing an alternate address corresponding to a third entry of the table;

moving a first data stored in the first entry to the third entry; and storing a second data in the first entry.

20. The method of claim 19, wherein computing said alternate address comprises:

determining a first index function which was used to generate an original look-up address corresponding to the first data;

determining an intermediate address by applying an inverse of the first index function to the input address; and applying a second index function to the intermediate address.

21. The method of claim 19, wherein prior to moving the first data and in response to detecting the third entry is not available, the method further comprises:

computing a second alternate address corresponding to the third entry of the table; and moving a third data stored in the third entry to a fourth entry of the table.

* * * * *